US012794738B2

(12) United States Patent
Vitthaladevuni et al.

(10) Patent No.: US 12,794,738 B2
(45) Date of Patent: Nov. 10, 2026

(54) REPORTING WEIGHT UPDATES TO A NEURAL NETWORK FOR GENERATING CHANNEL STATE INFORMATION FEEDBACK

(71) Applicant: QUALCOMM Incorporated, San Diego, CA (US)

(72) Inventors: Pavan Kumar Vitthaladevuni, San Diego, CA (US); Alexandros Manolakos, Escondido, CA (US); Taesang Yoo, San Diego, CA (US); Naga Bhushan, San Diego, CA (US); June Namgoong, San Diego, CA (US); Jay Kumar Sundararajan, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 18/003,854

(22) PCT Filed: Aug. 13, 2021

(86) PCT No.: PCT/US2021/071183

§ 371 (c)(1),
(2) Date: Dec. 29, 2022

(87) PCT Pub. No.: WO2022/040661

PCT Pub. Date: Feb. 24, 2022

(65) Prior Publication Data

US 2023/0261908 A1 Aug. 17, 2023

(30) Foreign Application Priority Data

Aug. 18, 2020 (GR) ............................. 20200100485

(51) Int. Cl.
*H04L 25/02* (2006.01)
*H04B 7/06* (2006.01)

(52) U.S. Cl.
CPC ....... *H04L 25/0254* (2013.01); *H04B 7/0626* (2013.01); *H04L 25/0226* (2013.01)

(58) Field of Classification Search
CPC ............. H04L 25/0254; H04L 25/0226; H04L 1/0026; H04L 1/003; H04B 7/0626; G06N 3/045; G06N 3/08
See application file for complete search history.

(56) References Cited

U.S. PATENT DOCUMENTS 7,013,165 B2 * 3/2006 Yoon ........................ H01Q 3/26 375/147
7,545,876 B2 * 6/2009 Shashidhar .......... H04B 7/0669 375/267

(Continued)

FOREIGN PATENT DOCUMENTS

CN 111434049 A 7/2020

OTHER PUBLICATIONS

Xuan T., et al., "Image Semantic Segmentation Technology Based on Deep Learning", China Ocean Press, Dec. 31, 2019, 14 pages, 1st edition, Section 5.3.2, pp. 87-90.

(Continued)

*Primary Examiner* — Un C Cho
(74) *Attorney, Agent, or Firm* — Harrity & Harrity LLP

(57) ABSTRACT

Various aspects of the present disclosure generally relate to wireless communication. In some aspects, a first device may receive a request to report updates for one or more weights of a neural network configured for encoding channel state information feedback messages. The first device may transmit a report that indicates the updates for the one or more weights. Numerous other aspects are provided.

27 Claims, 19 Drawing Sheets

(56) References Cited

U.S. PATENT DOCUMENTS

| | | | | |
|---|---|---|---|---|
| 7,961,810 | B2 * | 6/2011 | Varadarajan | H04B 7/066<br>375/267 |
| 8,027,479 | B2 * | 9/2011 | Villemoes | H04S 7/30<br>381/23 |
| 8,068,457 | B2 * | 11/2011 | Pi | H04L 5/0005<br>370/235 |
| 8,195,184 | B2 * | 6/2012 | Kent | H04L 1/0026<br>370/395.42 |
| 8,223,626 | B2 * | 7/2012 | Au | H04L 1/0618<br>370/208 |
| 8,233,552 | B2 * | 7/2012 | Kim | H04B 7/0417<br>375/260 |
| 8,358,143 | B2 * | 1/2013 | Walker | G01R 17/105<br>324/706 |
| 8,451,951 | B2 * | 5/2013 | Caire | H04L 1/0003<br>455/69 |
| 8,498,195 | B1 * | 7/2013 | Lee | H04L 1/1893<br>370/208 |
| 8,699,602 | B2 * | 4/2014 | Chen | H04L 5/0023<br>375/267 |
| 9,048,977 | B2 * | 6/2015 | Ramprashad | H04L 1/0025 |
| 9,717,103 | B2 * | 7/2017 | Tsuboi | H04W 72/04 |
| 10,602,389 | B2 | 3/2020 | Lee et al. | |
| 10,892,806 | B2 * | 1/2021 | O'Shea | H04B 7/0452 |
| 10,966,135 | B2 * | 3/2021 | Svennebring | H04L 45/42 |
| 11,477,716 | B2 * | 10/2022 | Lee | H04W 36/0061 |
| 11,737,106 | B2 * | 8/2023 | Namgoong | H04W 72/0473<br>370/329 |
| 11,863,354 | B2 * | 1/2024 | Lee | H04L 25/0254 |
| 2003/0087673 | A1 * | 5/2003 | Walton | H04B 7/0452<br>455/562.1 |
| 2003/0125040 | A1 * | 7/2003 | Walton | H04B 7/0626<br>455/454 |
| 2006/0182196 | A1 * | 8/2006 | Shashidhar | H04L 25/0204<br>375/267 |
| 2007/0104288 | A1 * | 5/2007 | Kim | H04L 1/0606<br>375/267 |
| 2007/0162819 | A1 * | 7/2007 | Kawamoto | H04L 1/0625<br>714/758 |
| 2007/0280485 | A1 * | 12/2007 | Villemoes | G10L 19/008<br>381/23 |
| 2007/0286304 | A1 * | 12/2007 | Kim | H04L 25/03343<br>375/267 |
| 2008/0063115 | A1 * | 3/2008 | Varadarajan | H04B 1/1027<br>370/335 |
| 2008/0268862 | A1 * | 10/2008 | Kent | H04B 7/0632<br>455/452.2 |
| 2010/0227561 | A1 * | 9/2010 | Chakraborty | H04L 5/0085<br>455/67.11 |
| 2011/0001501 | A1 * | 1/2011 | Walker | G01R 35/00<br>324/706 |
| 2011/0222472 | A1 * | 9/2011 | Breit | H04L 25/03343<br>370/328 |
| 2011/0235533 | A1 * | 9/2011 | Breit | H04B 7/0452<br>370/252 |
| 2015/0003325 | A1 * | 1/2015 | Sajadieh | H04J 11/005<br>370/328 |
| 2015/0103774 | A1 * | 4/2015 | Nagata | H04B 7/0626<br>370/329 |
| 2017/0323199 | A1 * | 11/2017 | Wu | G06N 3/04 |
| 2018/0322388 | A1 * | 11/2018 | O'Shea | G06N 3/044 |
| 2018/0367192 | A1 * | 12/2018 | O'Shea | H04B 7/0452 |
| 2020/0059282 | A1 | 2/2020 | Wu et al. | |
| 2020/0099432 | A1 * | 3/2020 | Määttanen | H04B 7/0617 |
| 2020/0343985 | A1 * | 10/2020 | O'Shea | G06N 20/00 |
| 2020/0366326 | A1 * | 11/2020 | Jassal | G06N 3/08 |
| 2020/0366385 | A1 * | 11/2020 | Ge | G06N 3/045 |
| 2021/0049451 | A1 * | 2/2021 | Wang | H04W 24/02 |
| 2021/0192320 | A1 * | 6/2021 | Hoydis | G06N 3/084 |
| 2021/0258063 | A1 * | 8/2021 | Ottersten | H04W 24/04 |
| 2021/0342687 | A1 * | 11/2021 | Wang | G06N 3/08 |
| 2022/0190883 | A1 * | 6/2022 | Kaya | H04B 7/0695 |
| 2022/0284267 | A1 * | 9/2022 | Vitthaladevuni | G06N 3/045 |
| 2022/0284282 | A1 * | 9/2022 | Vitthaladevuni | G06N 3/04 |
| 2022/0286324 | A1 * | 9/2022 | Ahmed Salem | H04L 25/0222 |
| 2023/0084164 | A1 * | 3/2023 | Chen | H04B 7/0695<br>375/267 |
| 2023/0114870 | A1 * | 4/2023 | Namgoong | G06N 3/084<br>706/25 |
| 2023/0299831 | A1 * | 9/2023 | Manolakos | H04B 7/0626<br>370/329 |
| 2023/0328559 | A1 * | 10/2023 | Manolakos | H04L 41/0806<br>370/252 |
| 2024/0040461 | A1 * | 2/2024 | Da Silva | H04W 36/30 |

OTHER PUBLICATIONS

International Search Report and Written Opinion—PCT/US2021/071183—ISA/EPO—Dec. 9, 2021.

Wu, P., et al., "Learning a Measurement Matrix in Compressed CSI Feedback for Millimeter Wave Massive MIMO Systems", Arxiv. Org, Cornell University Library, 201 Olin Library Cornell University Ithaca, NY14853, Mar. 6, 2019 (Mar. 6, 2019), XP081626108, Section II-B, III.

Wu P., et al., "Compressed CSI Feedback With Learned Measurement Matrix for mmWave Massive MIMO", arXiv:1903.02127v4 [cs.IT], arxiv.org, Jul. 11, 2020, pp. 1-4.

O'Shea T.J., et al., "Deep Learning-Based MIMO Communication", arXiv:1707.07980v1, Jul. 25, 2017, pp. 1-9, Abstract (autoencoder compact binary channel state information (CSI) as feedback), p. 1, col. 2, Para 2, closed-loop systems, with CSI at the transmitter fed back from the receiver, p. 4, Section A, Para 2 (weight updates are computed).

Ren J., et al., "Scheduling for Cellular Federated Edge Learning with Importance and Channel Awareness", arXiv:2004.00490 v2, pp. 1-32, Jun. 23, 2020, Abstract [1-8] (communicating learning updates . . . schedule the most informative local learning updated importance measured by its gradient divergence), p. 8, Fig 2 (Steps 3, 4, 5: Importance Report, Device Selection, Gradient Upload), p. 15, Theorem 1 [168-171] (Scheduling probability based on gradient norm, latency).

Wenqi S., et al., "Scheduling Policies for Federated Learning in Wireless Networks: an Overview", ZTE Communications, vol. 18, No. 2, pp. 11-19, Jun. 2020, Abstract [359] (uploading model updates), p. 12, col. 1, Para 2 [379-382], (edge server aggregates the local models . . . send the gradient), p. 14, Section 2.2, Para 3 [457], (retains k entries with largest absolute values).

* cited by examiner

REPORTING WEIGHT UPDATES TO A NEURAL NETWORK FOR GENERATING CHANNEL STATE INFORMATION FEEDBACK

CROSS-REFERENCE TO RELATED APPLICATIONS

This Patent Application is a 371 national stage of PCT Application No. PCT/US2021/071183 filed on Aug. 13, 2021, entitled "REPORTING WEIGHT UPDATES TO A NEURAL NETWORK FOR GENERATING CHANNEL STATE INFORMATION FEEDBACK," which claims priority to Greek Patent Application No. 20200100485, filed on Aug. 18, 2020, entitled "REPORTING WEIGHT UPDATES TO A NEURAL NETWORK FOR GENERATING CHANNEL STATE INFORMATION FEEDBACK." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for reporting weight updates to a neural network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first device includes receiving a request to report updates for one or more weights of a neural network configured for encoding channel state information feedback (CSF) messages. The method may also include transmitting a report that indicates the updates for the one or more weights.

In some aspects, a method of wireless communication performed by a second device includes transmitting, to a first device, a request to report updates for one or more weights of a neural network configured for encoding CSF messages. The method may also include receiving a report that indicates the updates for the one or more weights.

In some aspects, a first device for wireless communication includes a memory and one or more processors coupled to the memory. The memory and the one or more processors are configured to receive a request to report updates for one or more weights of a neural network configured for encoding CSF messages. The memory and the one or more processors are further configured to and transmit a report that indicates the updates for the one or more weights.

In some aspects, a second device for wireless communication includes a memory and one or more processors coupled to the memory. The memory and the one or more processors are configured to transmit, to a first device, a request to report updates for one or more weights of a neural network configured for encoding CSF messages. The memory and the one or more processors are further configured to receive a report that indicates the updates for the one or more weights.

In some aspects, a non-transitory computer-readable medium storing a set of instructions for wireless communication includes one or more instructions that, when executed by one or more processors of a first device, cause the first device to receive a request to report updates for one or more weights of a neural network configured for encoding CSF messages. The one or more instructions further cause the first device to transmit a report that indicates the updates for the one or more weights.

In some aspects, a non-transitory computer-readable medium storing a set of instructions for wireless communication includes one or more instructions that, when executed by one or more processors of a second device, cause the second device to transmit, to a first device, a request to report updates for one or more weights of a neural network configured for encoding CSF messages. The one or more instructions further cause the first device to receive a report that indicates the updates for the one or more weights.

In some aspects, an apparatus for wireless communication includes means for receiving a request to report updates for one or more weights of a neural network configured for encoding CSF messages. The apparatus further includes means for transmitting a report that indicates the updates for the one or more weights.

In some aspects, an apparatus for wireless communication includes means for transmitting, to a first device, a request to report updates for one or more weights of a neural network configured for encoding CSF messages. The apparatus further includes means for receiving a report that indicates the updates for the one or more weights.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
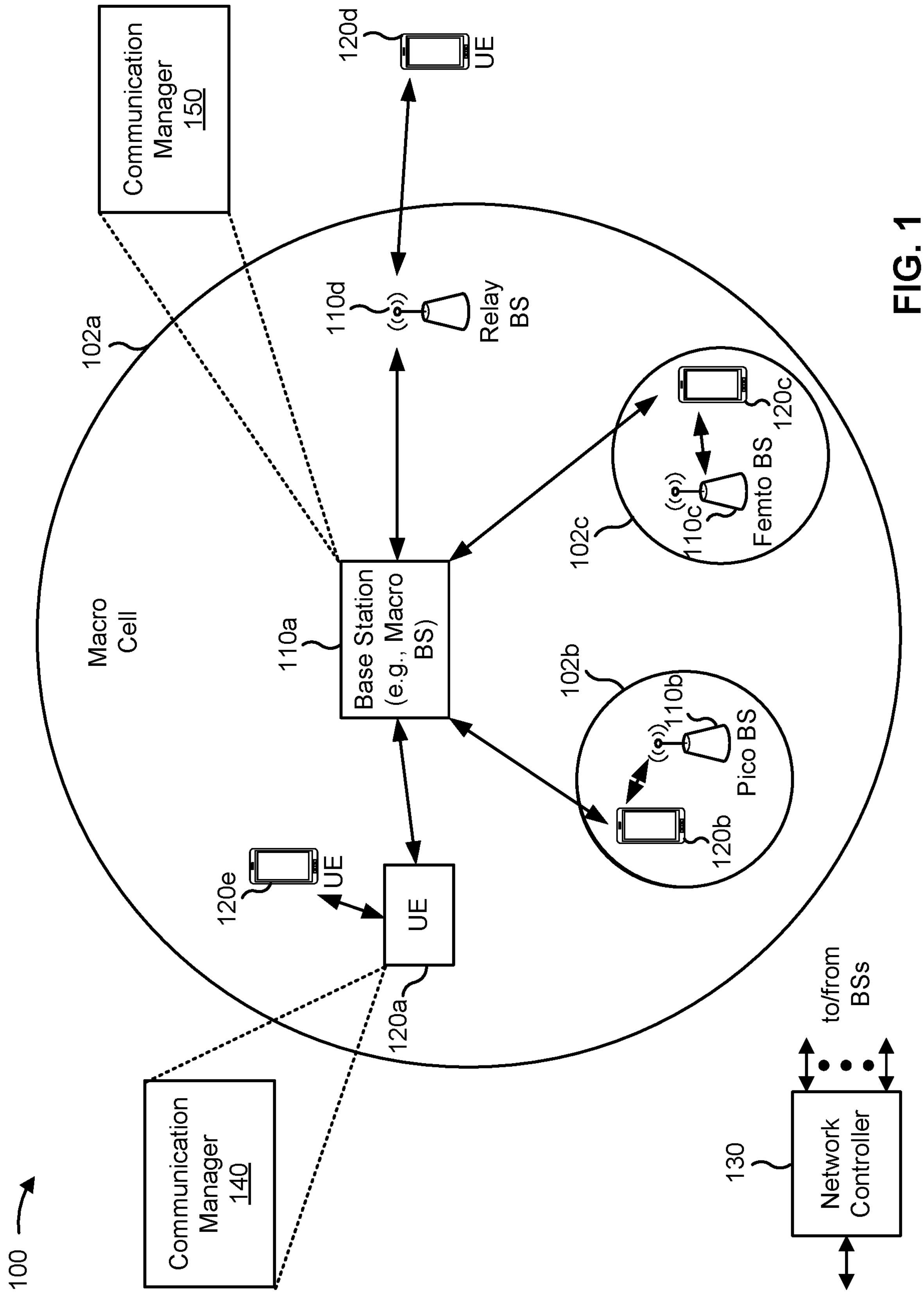
FIG. 1 is a diagram illustrating an example of a wireless network, in accordance with the present disclosure.

An encoding device operating in a network may measure reference signals and/or the like to report to a network entity. For example, the encoding device may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the base station may consume communication and/or network resources.

In some aspects described herein, an encoding device (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may train one or more neural networks to learn dependence of measured qualities on individual parameters, isolate the measured qualities through various layers of the one or more neural networks (also referred to as "operations"), and compress measurements in a way that limits compression loss. In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information. For example, the encoding device may encode measurements, to produce compressed measurements, using one or more extraction operations and compression operations associated with a neural network, with the one or more extraction operations and compression operations being based at least in part on a set of features of the measurements.

The encoding device may transmit the compressed measurements to a network entity, such as server, a TRP, another UE, a base station, and/or the like. Although examples described herein refer to a base station as the decoding device, the decoding device may be any network entity. The network entity may be referred to as a "decoding device."

The decoding device may decode the compressed measurements using one or more decompression operations and reconstruction operations associated with a neural network. The one or more decompression and reconstruction operations may be based at least in part on a set of features of the compressed data set to produce reconstructed measurements. The decoding device may use the reconstructed measurements as channel state information feedback.

Using CSF that is encoded using a neural network to compress measurements may conserve network resources. However, as a channel and/or an environment changes, weights of the neural network should change as well. For example, if Doppler parameters change (e.g., an encoding device is carried by a vehicle), layers related to Doppler may need to change. If a pedestrian holding the encoding device turns a corner, non-Doppler related weights may need to change. If the encoding device hands over from a first decoding device (e.g., a base station) with 128 ports to a second decoding device that has 32 ports or fewer, non-Doppler related weights of layers that account for decoder-side information may need to change. However, if the encoding device changes weights of the neural network, the decoding device may not be able to decode the CSF, which may consume network resources to detect and correct.

In some aspects described herein, an encoding device may receive a request to report updates for one or more weights of a neural network configured for encoding CSF. In some aspects, a decoding device (e.g., a base station) may transmit a request for updates made by the encoding device and may identify one or more layers (e.g., with one or more layer identifications) for which the encoding device is to report weights. In some aspects, the request may indicate a subset of weights within the one or more layers for which the encoding device is to report weights.

Based at least in part on the decoding device requesting and receiving a report that indicates updates to weights of the neural network, the decoding device may decode CSF based at least in part on the updates to the weights. In this way, computing, communication, and/or network resources may be conserved that may otherwise have been used to detect and recover from errors that are based at least in part on the decoding device failing to decode the CSF.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may receive a request to report updates for one or more weights of a neural network configured for encoding CSF messages. The communication manager 140 may also transmit a report that indicates the updates for the one or more weights. Additionally, or alternatively, the communication manager 140 may perform one or more other operations described herein.

In some aspects, the base station 110 may include a communication manager 150. As described in more detail elsewhere herein, the communication manager 150 may transmit, to a first device, a request to report updates for one or more weights of a neural network configured for encoding CSF messages. The communication manager 150 may also receive a report that indicates the updates for the one or more weights. Additionally, or alternatively, the communication manager 150 may perform one or more other operations described herein.

As indicated above, FIG. 1 is provided as an example. Other examples may differ from what is described with regard to FIG. 1.

Figure 2:
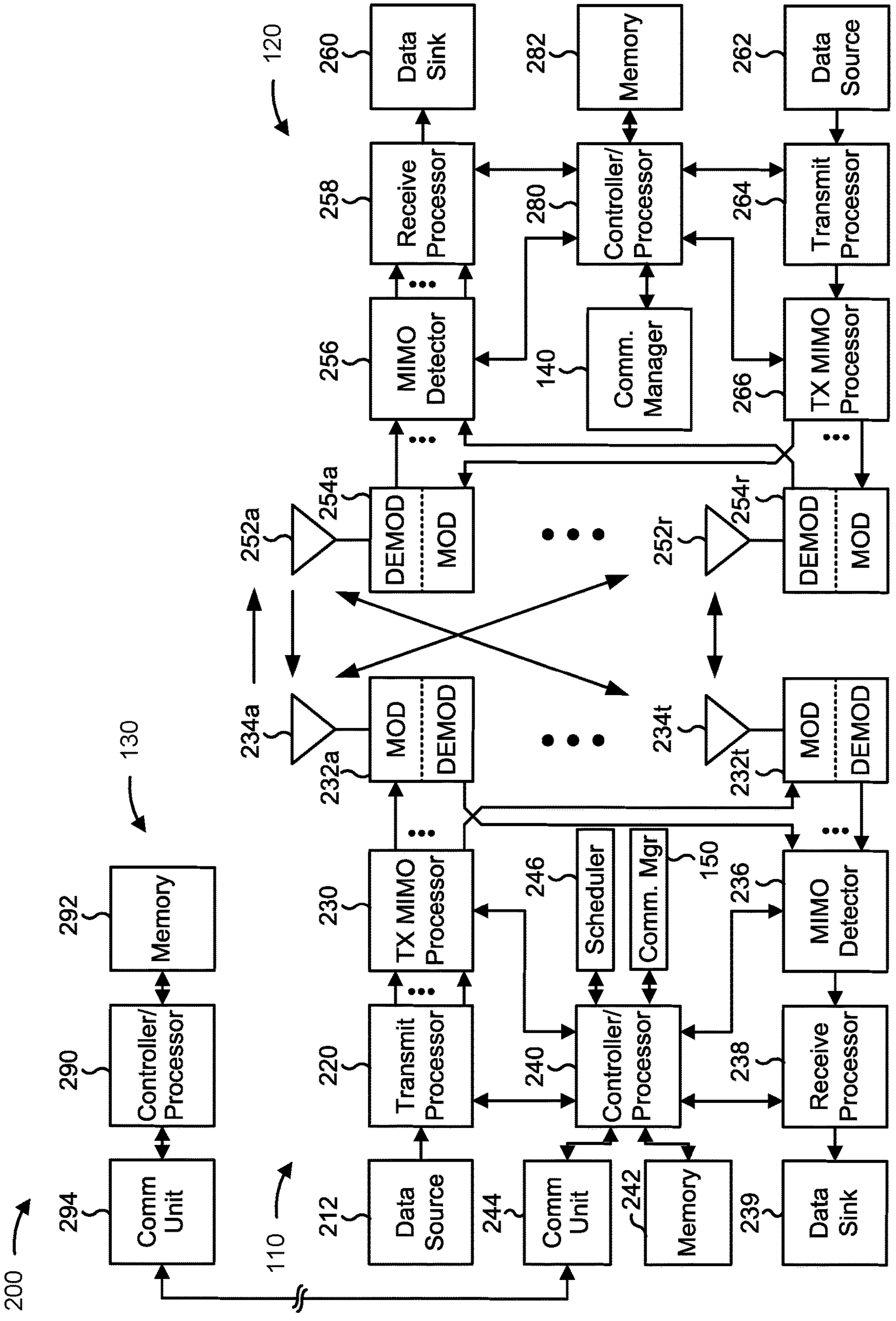
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-19).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-19).

Controller/processor 240 of base station 110, controller/processor 280 of UE 120, and/or any other component(s) of FIG. 2 may perform one or more techniques associated with reporting weight updates to a neural network for generating channel state information feedback (CSF), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, an encoding device (e.g., UE 120) may include means for receiving a request to report updates for one or more weights of a neural network configured for encoding CSF messages; means for transmitting a report that indicates the updates for the one or more weights; and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a decoding device (e.g., UE 120, base station 110, and/or the like) may include means for transmitting, to a first device, a request to report updates for one or more weights of a neural network configured for encoding CSF messages; and means for receiving a report that indicates the updates for the one or more weights; and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
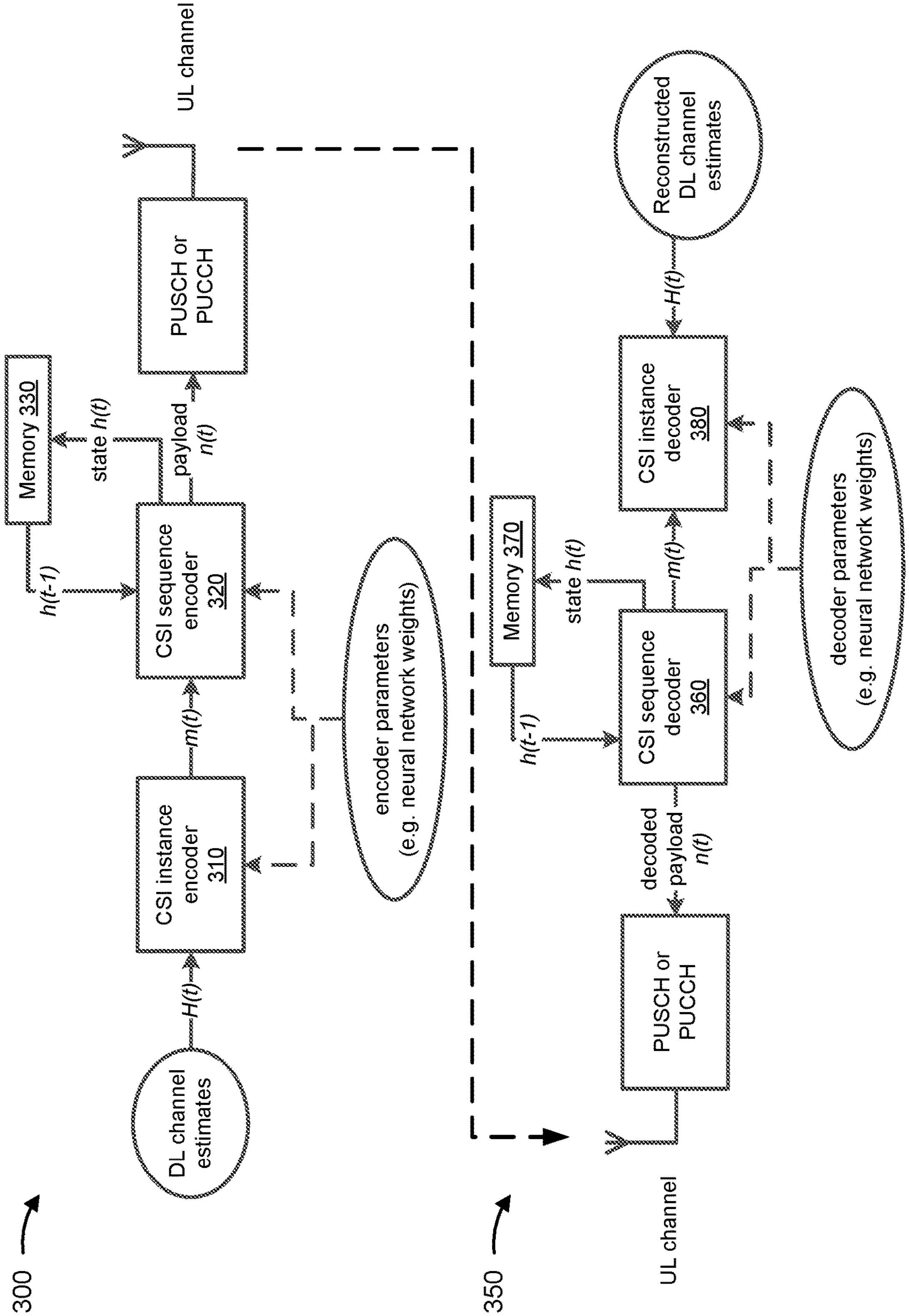
FIG. 3 is a diagram illustrating an example of an encoding device and a decoding device that use previously stored channel state information, in accordance with the present disclosure.

FIG. 3 illustrates an example of an encoding device 300 and a decoding device 350 that use previously stored channel state information (CSI), in accordance with various aspects of the present disclosure. FIG. 3 shows the encoding device 300 (e.g., UE 120) with a CSI instance encoder 310, a CSI sequence encoder 320, and a memory 330. FIG. 3 also shows the decoding device 350 (e.g., BS 110) with a CSI sequence decoder 360, a memory 370, and a CSI instance decoder 380.

In some aspects, the encoding device 300 and the decoding device 350 may take advantage of a correlation of CSI instances over time (temporal aspect), or over a sequence of CSI instances for a sequence of channel estimates. The encoding device 300 and the decoding device 350 may save and use previously stored CSI and encode and decode only a change in the CSI from a previous instance. This may provide for less CSI feedback overhead and improve performance. The encoding device 300 may also be able to encode more accurate CSI, and neural networks may be trained with more accurate CSI.

As shown in FIG. 3, CSI instance encoder 310 may encode a CSI instance into intermediate encoded CSI for each DL channel estimate in a sequence of DL channel estimates. CSI instance encoder 310 (e.g., a feedforward network) may use neural network encoder weights θ. The intermediate encoded CSI may be represented as $m(t) \triangleq f_{enc,\theta}(H(t))$. CSI sequence encoder 320 (e.g., a Long Short-Term Memory (LSTM) network) may determine a previously encoded CSI instance h(t−1) from memory 330 and compare the intermediate encoded CSI m(t) and the previously encoded CSI instance h(t−1) to determine a change n(t) in the encoded CSI. The change n(t) may be a part of a channel estimate that is new and may not be predicted by the decoding device 350. The encoded CSI at this point may be represented by $[n(t), h_{enc}(t)] \triangleq g_{enc,\theta}(m(t), h_{enc}(t-1))$. CSI sequence encoder 320 may provide this change n(t) on the physical uplink shared channel (PUSCH) or the physical uplink control channel (PUCCH), and the encoding device 300 may transmit the change (e.g., information indicating the change) n(t) as the encoded CSI on the UL channel to the decoding device 350. Because the change is smaller than an entire CSI instance, the encoding device 300 may send a smaller payload for the encoded CSI on the UL channel, while including more detailed information in the encoded CSI for the change. CSI sequence encoder 320 may generate encoded CSI h(t) based at least in part on the intermediate encoded CSI m(t) and at least a portion of the previously encoded CSI instance h(t−1). CSI sequence encoder 320 may save the encoded CSI h(t) in memory 330.

CSI sequence decoder 360 may receive encoded CSI on the PUSCH or PUCCH. CSI sequence decoder 360 may determine that only the change n(t) of CSI is received as the encoded CSI. CSI sequence decoder 360 may determine an intermediate decoded CSI m(t) based at least in part on the encoded CSI and at least a portion of a previous intermediate decoded CSI instance h(t−1) from memory 370 and the change. CSI instance decoder 380 may decode the intermediate decoded CSI m(t) into decoded CSI. CSI sequence decoder 360 and CSI instance decoder 380 may use neural network decoder weights ϕ. The intermediate decoded CSI may be represented by $[\hat{m}(t), h_{dec}(t)] \triangleq g_{dec,\phi}(n(t), h_{enc}(t-1))$.

CSI sequence decoder 360 may generate decoded CSI h(t) based at least in part on the intermediate decoded CSI m(t) and at least a portion of the previously decoded CSI instance h(t−1). The decoding device 350 may reconstruct a DL channel estimate from the decoded CSI h(t), and the reconstructed channel estimate may be represented as $H\hat{}(t)\triangleq f\_(dec, \phi)(m\hat{}(t))$. CSI sequence decoder 360 may save the decoded CSI h(t) in memory 370.

Because the change n(t) is smaller than an entire CSI instance, the encoding device 300 may send a smaller payload on the UL channel. For example, if the DL channel has changed little from previous feedback, due to a low Doppler or little movement by the encoding device 300, an output of the CSI sequence encoder may be rather compact. In this way, the encoding device 300 may take advantage of a correlation of channel estimates over time. In some aspects, because the output is small, the encoding device 300 may include more detailed information in the encoded CSI for the change. In some aspects, the encoding device 300 may transmit an indication (e.g., flag) to the decoding device 350 that the encoded CSI is temporally encoded (a CSI change). Alternatively, the encoding device 300 may transmit an indication that the encoded CSI is encoded independently of any previously encoded CSI feedback. The decoding device 350 may decode the encoded CSI without using a previously decoded CSI instance. In some aspects, a device, which may include the encoding device 300 or the decoding device 350, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 300 may encode the CSI as $N^{-1/2}H$. The encoding device 300 may encode H and N separately. The encoding device 300 may partially encode H and N separately, and then jointly encode the two partially encoded outputs. Encoding H and N separately may be advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 300 or the decoding device 350, may train a neural network model using separately encoded H and N.

In some aspects, a reconstructed DL channel R may faithfully reflect the DL channel H, and this may be called explicit feedback. In some aspects, R may capture only that information required for the decoding device 350 to derive rank and precoding. CQI may be fed back separately. CSI feedback may be expressed as m(t), or as n(t) in a scenario of temporal encoding. Similarly to Type-II CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and ϕ and conveyed to the encoding device 300 or the decoding device 350).

In some aspects, the decoding device 350 and the encoding device 300 may maintain multiple encoder and decoder networks, each targeting a different payload size (for varying accuracy vs. UL overhead tradeoff). For each CSI feedback, depending on a reconstruction quality and an uplink budget (e.g., PUSCH payload size), the encoding device 300 may choose, or the decoding device 350 may instruct the encoding device 300 to choose, one of the encoders to construct the encoded CSI. The encoding device 300 may send an index of the encoder along with the CSI based at least in part on an encoder chosen by the encoding device 300. Similarly, the decoding device 350 and the encoding device 300 may maintain multiple encoder and decoder networks to cope with different antenna geometries and channel conditions. Note that while some operations are described for the decoding device 350 and the encoding device 300, these operations may also be performed by another device, as part of a preconfiguration of encoder and decoder weights and/or structures.

As indicated above, FIG. 3 may be provided as an example. Other examples may differ from what is described with regard to FIG. 3.

Figure 4:
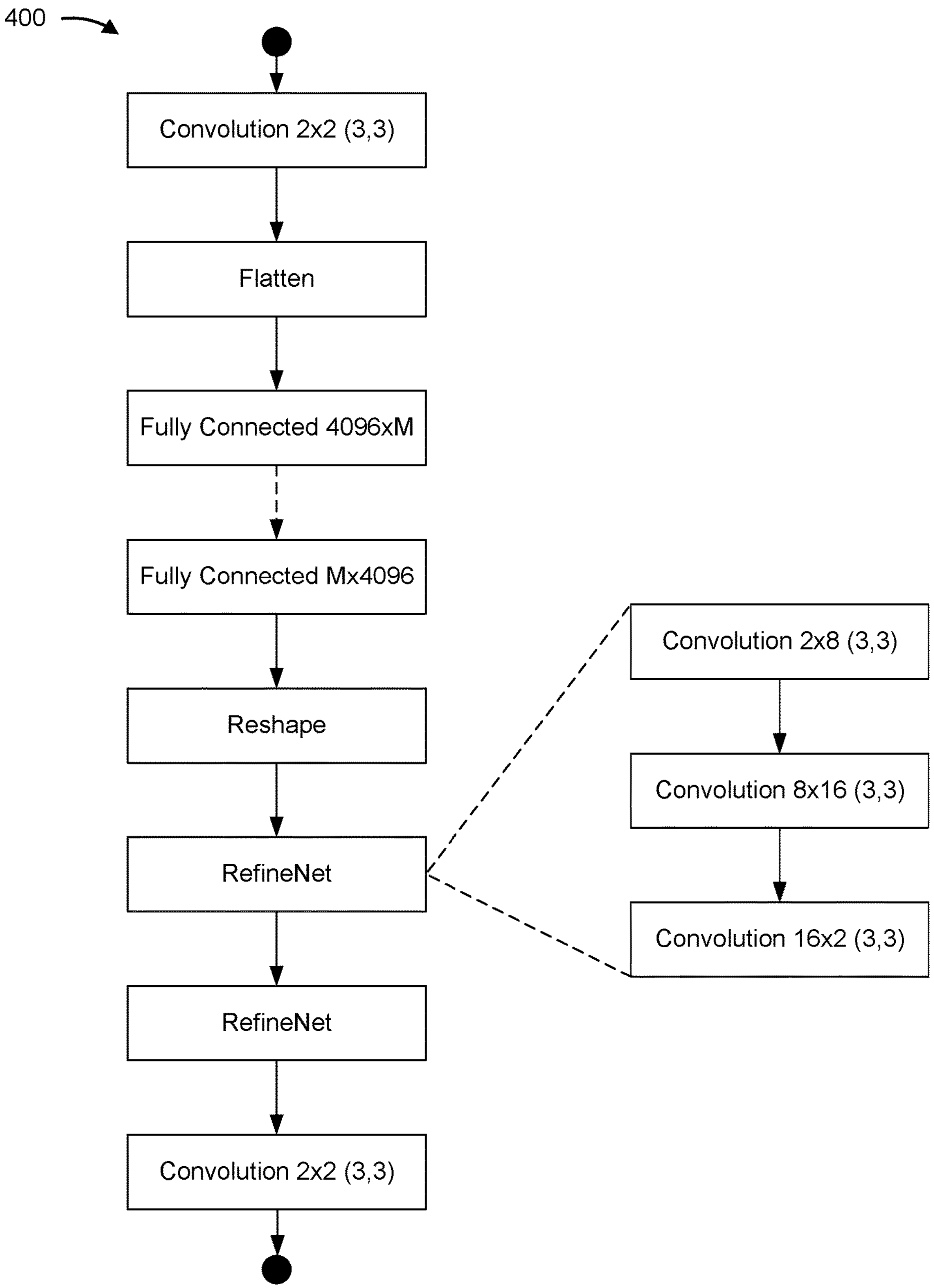
FIG. 4 is a diagram illustrating an example associated with an encoding device and a decoding device, in accordance with the present disclosure.

FIG. 4 is a diagram illustrating an example 400 associated with an encoding device and a decoding device, in accordance with various aspects of the present disclosure. The encoding device (e.g., UE 120, encoding device 300, and/or the like) may be configured to perform one or more operations on data to compress the data. The decoding device (e.g., base station 110, decoding device 350, and/or the like) may be configured to decode the compressed data to determine information.

As used herein, a "layer" of a neural network is used to denote an operation on input data. For example, a convolution layer, a fully connected layer, and/or the like denote associated operations on data that is input into a layer. A convolution A×B operation refers to an operation that converts a number of input features A into a number of output features B. "Kernel size" refers to a number of adjacent coefficients that are combined in a dimension.

As used herein, "weight" is used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in example 400, the encoding device may perform a convolution operation on samples. For example, the encoding device may receive a set of bits structured as a 2×64×32 data set that indicates IQ sampling for tap features (e.g., associated with multipath timing offsets) and spatial features (e.g., associated with different antennas of the encoding device). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The encoding device may perform a flattening operation to flatten the bits into a 4096 bit vector. The encoding device may apply a fully connected operation, having dimensions 4096×M, to the 4096 bit vector to output a payload of M bits. The encoding device may transmit the payload of Mbits to the decoding device.

The decoding device may apply a fully connected operation, having dimensions M×4096, to the M bit payload to output a 4096 bit vector. The decoding device may reshape the 4096 bit vector to have dimension 2×64×32. The decoding device may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64×32. The decoding device may also apply a 2×2 convolution operation with kernel sizes of 3 and 3 to generate decoded and/or reconstructed output.

As indicated above, FIG. 4 is provided merely as an example. Other examples may differ from what is described with regard to FIG. 4.

As described herein, an encoding device operating in a network may measure reference signals and/or the like to report to a decoding device. For example, a UE may measure reference signals during a beam management process to report CSF, may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the network entity may consume communication and/or network resources.

In some aspects described herein, an encoding device (e.g., a UE) may train one or more neural networks to learn dependence of measured qualities on individual parameters, isolate the measured qualities through various layers of the one or more neural networks (also referred to as "operations"), and compress measurements in a way that limits compression loss.

In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information.

Based at least in part on encoding and decoding a data set using a neural network for uplink communication, the encoding device may transmit CSF with a reduced payload. This may conserve network resources that may otherwise have been used to transmit a full data set as sampled by the encoding device.

Figure 5:
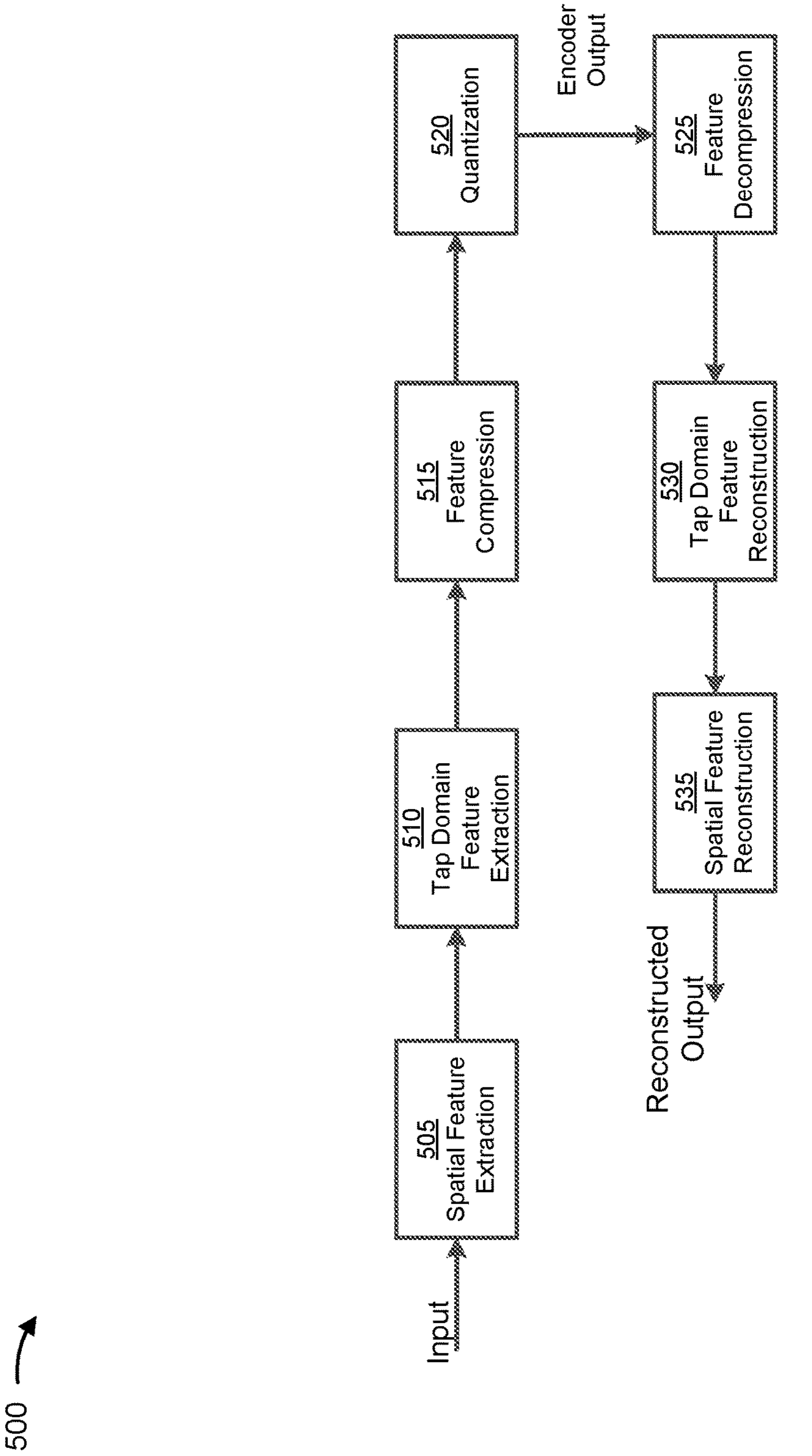
FIGS. 5-8 are diagrams illustrating examples associated with encoding and decoding a data set using a neural network for uplink communication, in accordance with the present disclosure.

FIG. 5 is a diagram illustrating an example 500 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 505, the encoding device may perform a spatial feature extraction on the data. As shown by reference number 510, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 515, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 520, the encoding device may perform a quantization operation. In some aspects, the encoding device may perform the quantization operation after flattening the output of the compression operation and/or performing a fully connected operation after flattening the output.

As shown by reference number 525, the decoding device may perform a feature decompression. As shown by reference number 530, the decoding device may perform a tap domain feature reconstruction. As shown by reference number 535, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

As indicated above, FIG. 5 is provided merely as an example. Other examples may differ from what is described with regard to FIG. 5.

Figure 6:
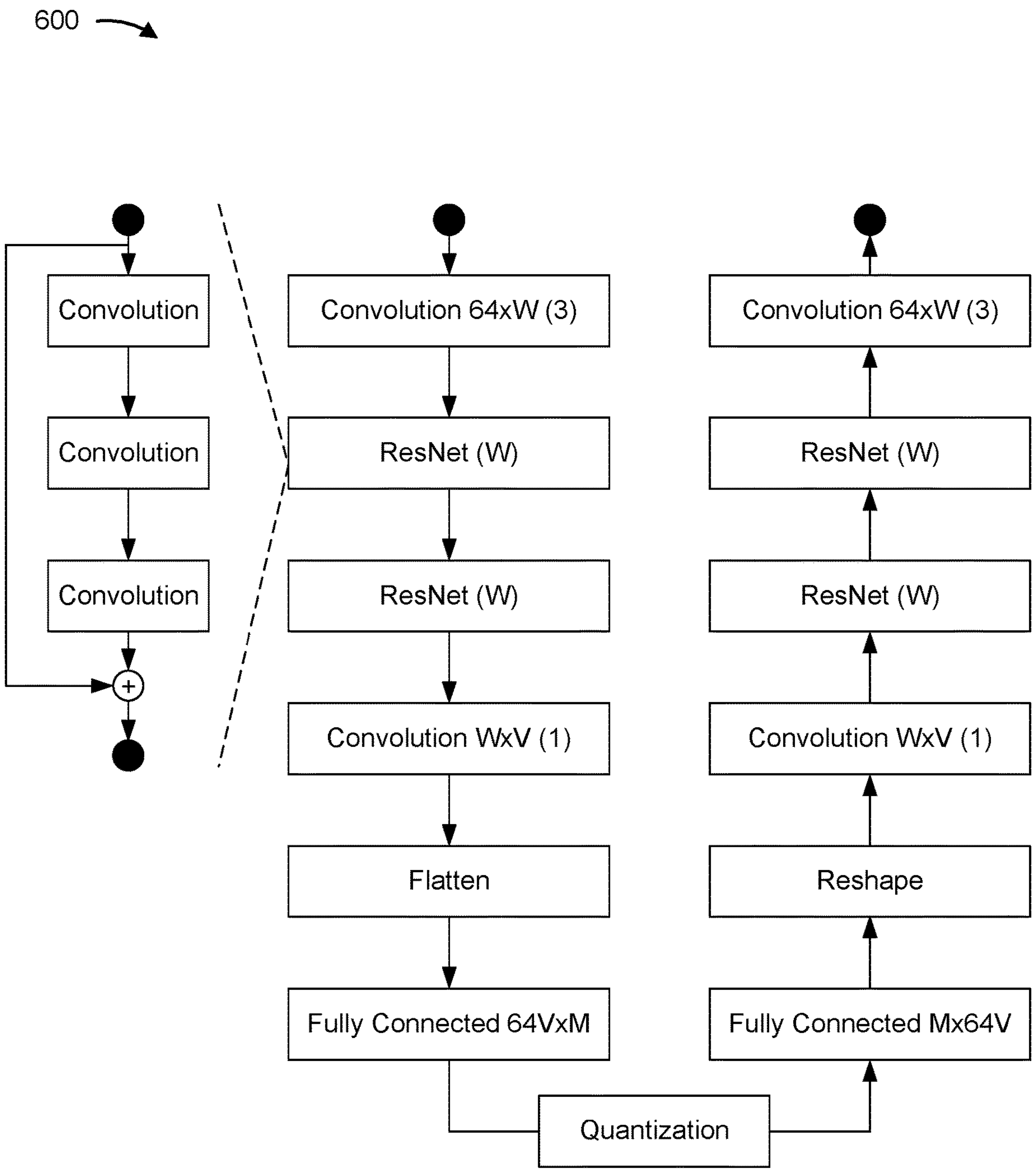

FIG. 6 is a diagram illustrating an example 600 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

As shown by example 600, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension (to extract the spatial feature) and simple convolution with a small kernel size (e.g., 3) in the tap dimension (to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a pointwise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension (to reconstruct the spatial feature) and simple convolution with a small kernel size (e.g., 3) in the tap dimension (to reconstruct the short tap feature). Output from the 64×W convolution operation may be a 64×64 matrix.

In some aspects, values of M, W, and/or V may be configurable to adjust weights of the features, payload size, and/or the like.

As indicated above, FIG. 6 is provided merely as an example. Other examples may differ from what is described with regard to FIG. 6.

Figure 7:
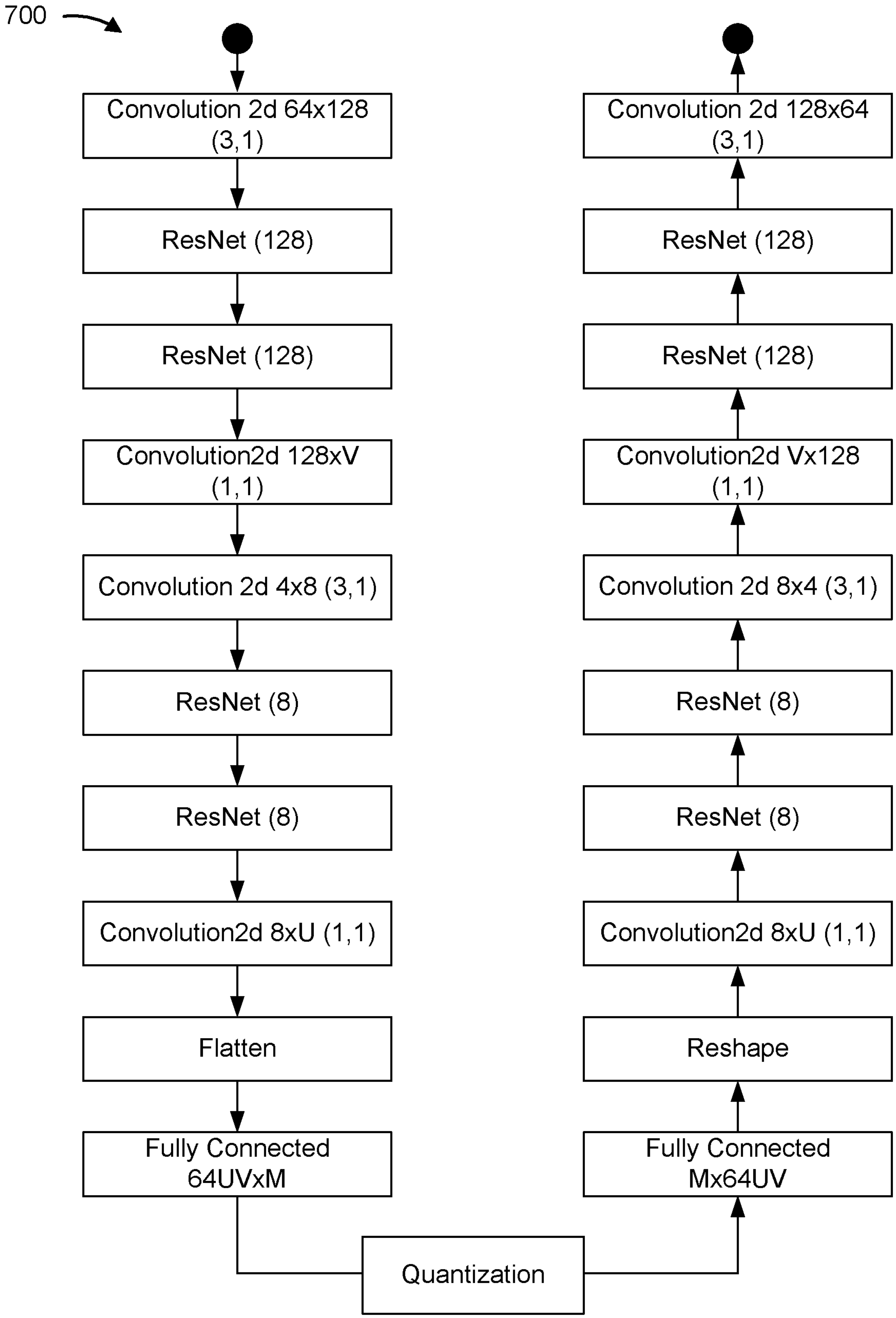

FIG. 7 is a diagram illustrating an example 700 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. As shown by example 700, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by example 700, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal (tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64×W convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet and output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2W convolution operation with kernel sizes 3 and 1 with output that is input to a BN layer followed by a LeakyReLU activation that produces an output data set of dimension 2W×64×V, a 2W×4W convolution operation with kernel sizes 3 and 1 with output that is input to a BN layer followed by a LeakyReLU activation that produces an output data set of dimension 4W×64×V, and 4W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal (tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (U×64×V) dimension matrix into a 64UV element vector. The encoding device may perform a 64UV×N fully connected operation to further compress a 2-dimensional spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64UV fully connected operation to decompress the low dimension vector of size M into a spatial-temporal feature data set. The decoding device may perform a reshaping operation to reshape the 64UV element vector into a (U×64×V) dimensional matrix. The decoding device may perform a 2-dimensional U×8 (with kernel of 1, 1) convolution operation on output from the reshaping operation. The U×8 convolution operation may include a pointwise (e.g., tap-wise) convolution operation. The U×8 convolution operation may decompress spatial features from a reduced dimension for each tap. Output from the U×8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the U×8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128x64 convolution operation may perform a spatial feature reconstruction associated with the decoding device antenna dimension, a short temporal feature reconstruction, and/or the like. Output from the 128x64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

As indicated above, FIG. 7 is provided merely as an example. Other examples may differ from what is described with regard to FIG. 7.

Figure 8:
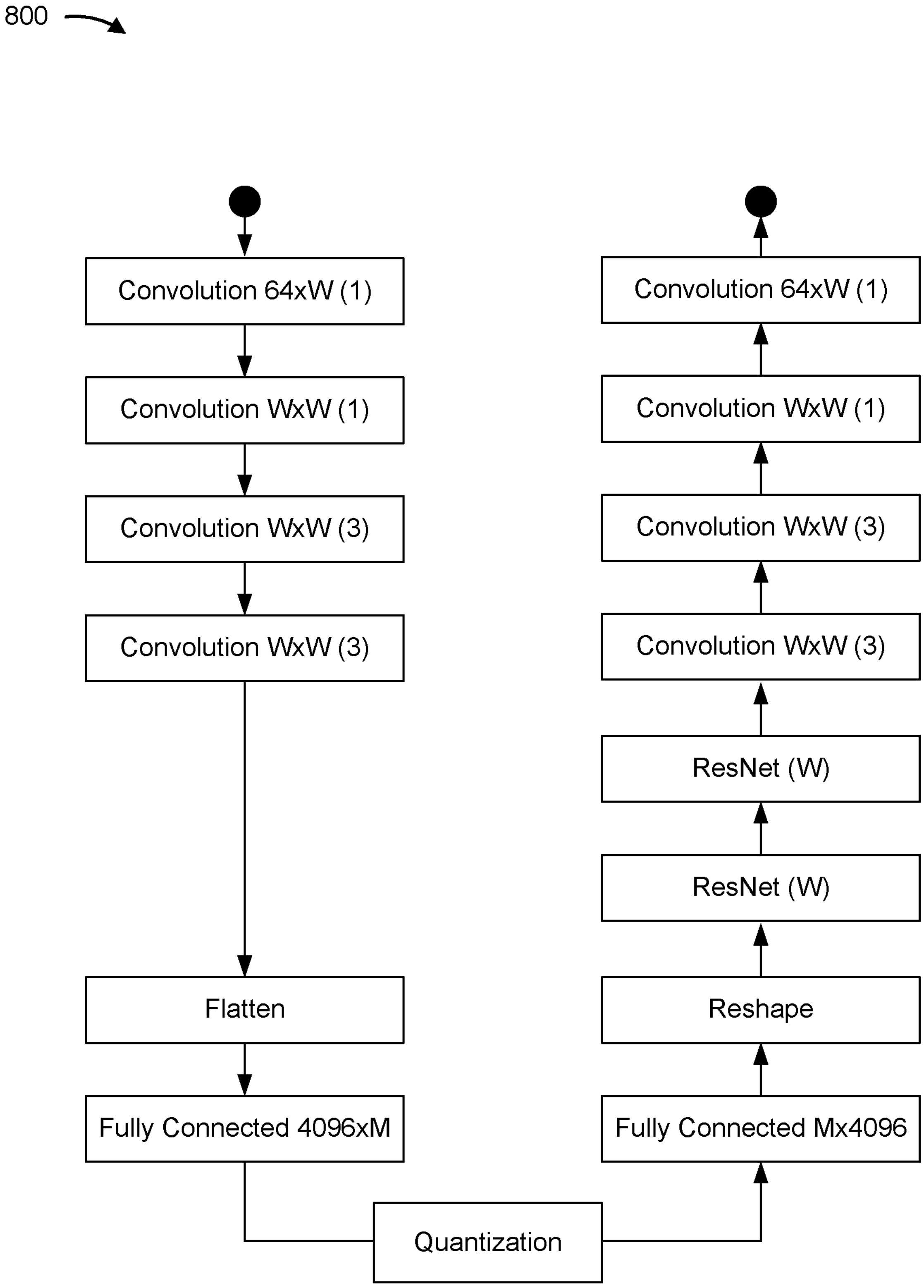

FIG. 8 is a diagram illustrating an example 800 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. The encoding device and decoding device operations may be asymmetric. In other words, the decoding device may have a greater number of layers than the decoding device.

As shown by example 800, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal (tap) feature extraction, and/or the like. In some aspects, the W×W convolution operations may be a series of 1-dimensional convolution operations.

The encoding device may perform a flattening operation to flatten the W×64 matrix into a 64W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal (tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix.

In some aspects, values of M, and/or W may be configurable to adjust weights of the features, payload size, and/or the like.

As indicated above, FIG. 8 is provided merely as an example. Other examples may differ from what is described with regard to FIG. 8.

Figure 9:
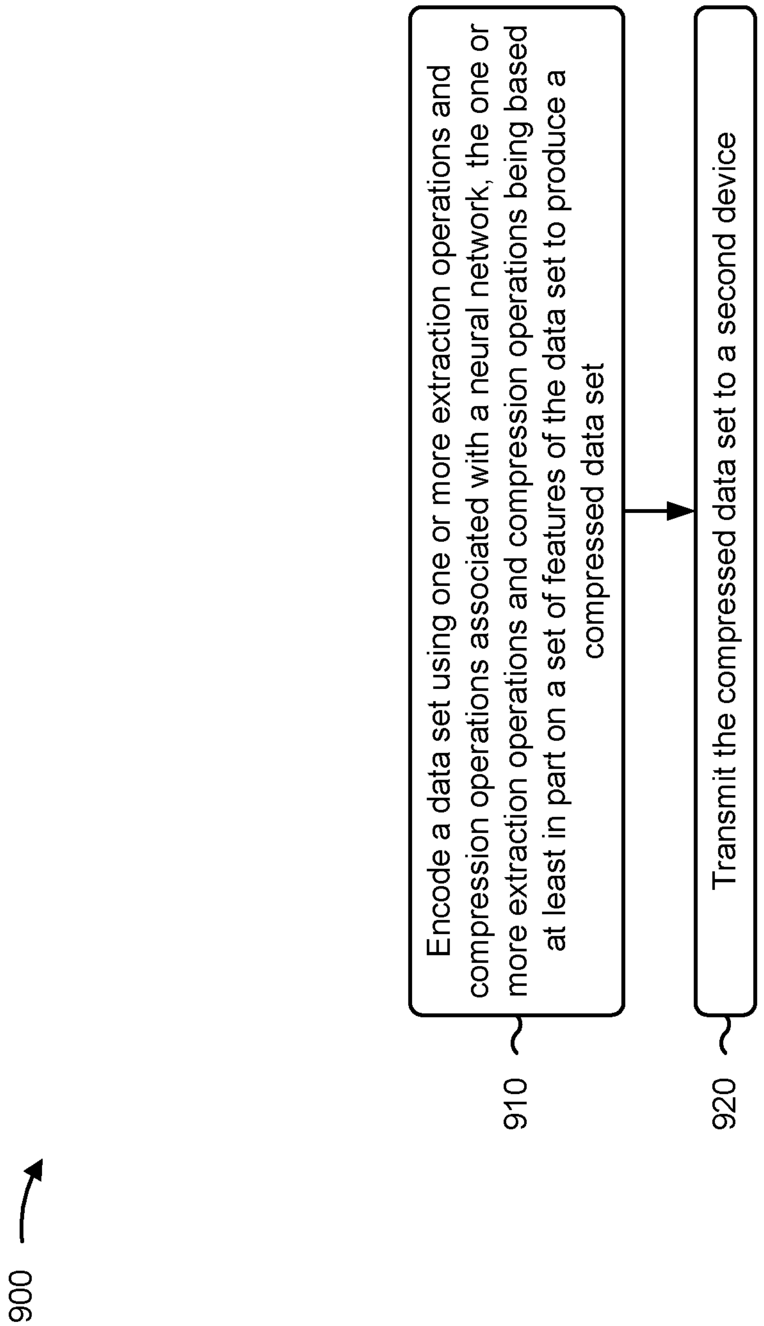
FIGS. 9 and 10 are diagrams illustrating example processes associated with encoding a data set using a neural network for uplink communication, in accordance with the present disclosure.

FIG. 9 is a diagram illustrating an example process 900 performed, for example, by a first device, in accordance with various aspects of the present disclosure. Example process 900 is an example where the first device (e.g., an encoding device, UE 120, apparatus 1400 of FIG. 14, and/or the like) performs operations associated with encoding a data set using a neural network.

As shown in FIG. 9, in some aspects, process 900 may include encoding a data set using one or more extraction operations and compression operations associated with a neural network, the one or more extraction operations and compression operations being based at least in part on a set of features of the data set to produce a compressed data set (block 910). For example, the first device (e.g., using encoding component 1408) may encode a data set using one or more extraction operations and compression operations associated with a neural network, the one or more extraction operations and compression operations being based at least in part on a set of features of the data set to produce a compressed data set, as described above.

As further shown in FIG. 9, in some aspects, process 900 may include transmitting the compressed data set to a second device (block 920). For example, the first device (e.g., using transmission component 1404) may transmit the compressed data set to a second device, as described above.

Process 900 may include additional aspects, such as any single aspect or any combination of aspects described below and/or in connection with one or more other processes described elsewhere herein.

In a first aspect, the data set is based at least in part on sampling of one or more reference signals.

In a second aspect, alone or in combination with the first aspect, transmitting the compressed data set to the second device includes transmitting channel state information feedback to the second device.

In a third aspect, alone or in combination with one or more of the first and second aspects, process 900 includes identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set.

In a fourth aspect, alone or in combination with one or more of the first through third aspects, the first type of operation includes a one-dimensional fully connected layer operation, and the second type of operation includes a convolution operation.

In a fifth aspect, alone or in combination with one or more of the first through fourth aspects, the one or more extraction operations and compression operations include multiple operations that include one or more of a convolution operation, a fully connected layer operation, or a residual neural network operation.

In a sixth aspect, alone or in combination with one or more of the first through fifth aspects, the one or more extraction operations and compression operations include a first extraction operation and a first compression operation performed for a first feature of the set of features of the data set, and a second extraction operation and a second compression operation performed for a second feature of the set of features of the data set.

In a seventh aspect, alone or in combination with one or more of the first through sixth aspects, process 900 includes performing one or more additional operations on an intermediate data set that is output after performing the one or more extraction operations and compression operations.

In an eighth aspect, alone or in combination with one or more of the first through seventh aspects, the one or more additional operations include one or more of a quantization operation, a flattening operation, or a fully connected operation.

In a ninth aspect, alone or in combination with one or more of the first through eighth aspects, the set of features of the data set includes one or more of a spatial feature, or a tap domain feature.

In a tenth aspect, alone or in combination with one or more of the first through ninth aspects, the one or more extraction operations and compression operations include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

In an eleventh aspect, alone or in combination with one or more of the first through tenth aspects, the one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
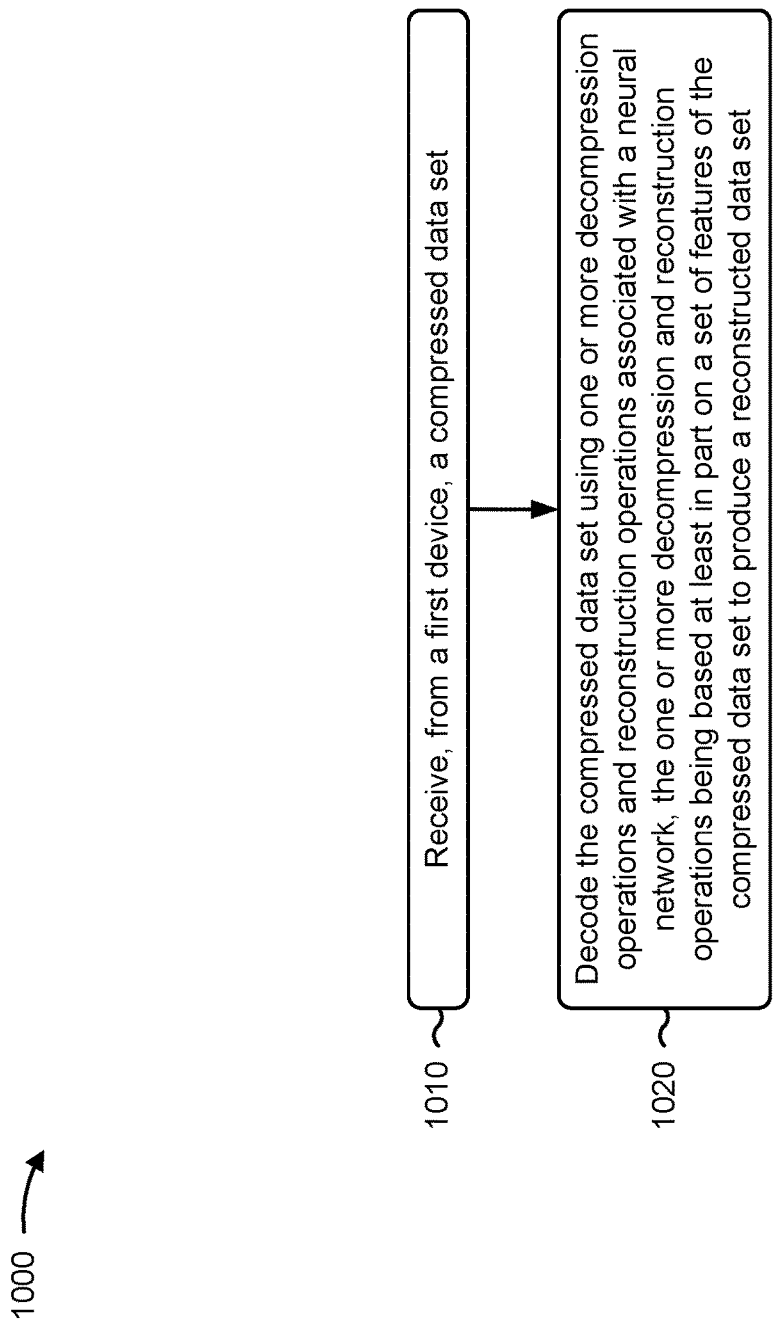

FIG. 10 is a diagram illustrating an example process 1000 performed, for example, by a second device, in accordance with various aspects of the present disclosure. Example process 1000 is an example where the second device (e.g., a decoding device, base station 110, apparatus 1500 of FIG. 15, and/or the like) performs operations associated with decoding a data set using a neural network.

As shown in FIG. 10, in some aspects, process 1000 may include receiving, from a first device, a compressed data set (block 1010). For example, the second device (e.g., using reception component 1502 of FIG. 15) may receive, from a first device, a compressed data set, as described above.

As further shown in FIG. 10, in some aspects, process 1000 may include decoding the compressed data set using one or more decompression operations and reconstruction operations associated with a neural network, the one or more decompression and reconstruction operations being based at least in part on a set of features of the compressed data set to produce a reconstructed data set (block 1020). For example, the second device (e.g., using decoding component 1508) may decode the compressed data set using one or more decompression operations and reconstruction operations associated with a neural network, the one or more decompression and reconstruction operations being based at least in part on a set of features of the compressed data set to produce a reconstructed data set, as described above.

Process 1000 may include additional aspects, such as any single aspect or any combination of aspects described below and/or in connection with one or more other processes described elsewhere herein.

In a first aspect, decoding the compressed data set using the one or more decompression operations and reconstruction operations includes performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

In a second aspect, alone or in combination with the first aspect, the compressed data set is based at least in part on sampling by the first device of one or more reference signals.

In a third aspect, alone or in combination with one or more of the first and second aspects, receiving the compressed data set includes receiving channel state information feedback from the first device.

In a fourth aspect, alone or in combination with one or more of the first through third aspects, the one or more decompression operations and reconstruction operations include a first type of operation performed in a dimension associated with a feature of the set of features of the compressed data set, and a second type of operation, that is different from the first type of operation, performed in remaining dimensions associated with other features of the set of features of the compressed data set.

In a fifth aspect, alone or in combination with one or more of the first through fourth aspects, the first type of operation includes a one-dimensional fully connected layer operation, and wherein the second type of operation includes a convolution operation.

In a sixth aspect, alone or in combination with one or more of the first through fifth aspects, the one or more decompression operations and reconstruction operations include multiple operations that include one or more of a convolution operation, a fully connected layer operation, or a residual neural network operation.

In a seventh aspect, alone or in combination with one or more of the first through sixth aspects, the one or more decompression operations and reconstruction operations include a first operation performed for a first feature of the set of features of the compressed data set, and a second operation performed for a second feature of the set of features of the compressed data set.

In an eighth aspect, alone or in combination with one or more of the first through seventh aspects, process 1000 includes performing a reshaping operation on the compressed data set.

In a ninth aspect, alone or in combination with one or more of the first through eighth aspects, the set of features of the compressed data set include one or more of a spatial feature, or a tap domain feature.

In a tenth aspect, alone or in combination with one or more of the first through ninth aspects, the one or more decompression operations and reconstruction operations include one or more of a feature decompression operation, a temporal feature reconstruction operation, or a spatial feature reconstruction operation.

In an eleventh aspect, alone or in combination with one or more of the first through tenth aspects, the one or more decompression operations and reconstruction operations include a first feature reconstruction operation performed for one or more features associated with the first device, and a second feature reconstruction operation performed for one or more features associated with the second device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Using CSF that is encoded using a neural network to compress measurements may conserve network resources. However, as a channel and/or an environment changes, weights of the neural network may change as well. For example, if Doppler a metric changes (e.g., an encoding device is carried by a vehicle), layers related to Doppler metric may need to change. If a pedestrian holding the encoding device turns a corner, non-Doppler related weights may need to change. If the encoding device hands over from a first decoding device (e.g., a base station), with 128 ports to a second decoding device that has 32 ports or fewer, non-Doppler related weights of layers that account for decoder-side information may need to change. However, if the encoding device changes weights of the neural network, the decoding device may not be able to decode the CSF, which may consume network resources to detect and correct.

In some aspects described herein, an encoding device may receive a request to report updates for one or more weights of a neural network configured for encoding CSF. In some aspects, a decoding device (e.g., a base station) may transmit a request for updates made by the encoding device and may identify one or more layers (e.g., with one or more layer identifications) for which the encoding device is to report weights. In some aspects, the request may indicate a subset of weights within the one or more layers for which the encoding device is to report weights.

Based at least in part on the decoding device requesting and receiving a report that indicates updates to weights of the neural network, the decoding device may decode CSF based at least in part on the updates to the weights. In this way, computing, communication, and/or network resources may be conserved that may otherwise have been used to detect and recover from errors that are based at least in part on the decoding device failing to decode the CSF.

Figure 11:
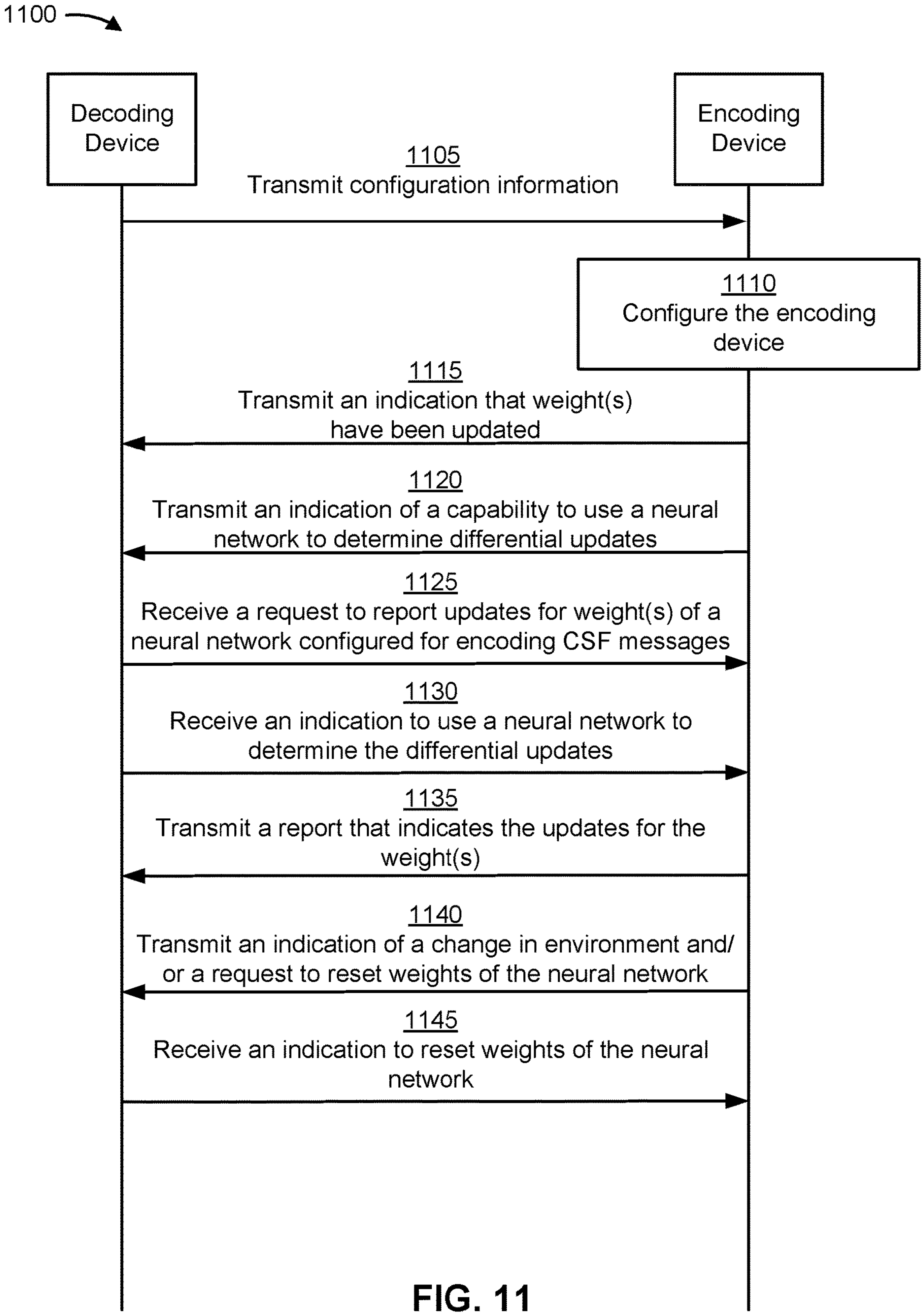
FIG. 11 is a diagram illustrating an example associated with reporting weight updates to a neural network for generating channel state information feedback, in accordance with the present disclosure.

FIG. 11 is a diagram illustrating an example 1100 of reporting weight updates to a neural network for generating channel state information feedback, in accordance with various aspects of the present disclosure. As shown in FIG. 11, an encoding device (e.g., UE 120, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may communicate (e.g., transmit an uplink transmission and/or receive a downlink transmission) with a decoding device (e.g., base station 110, UE 120, a server, a TRP, a network entity, and/or the like). The encoding device and the decoding device may be part of a wireless network (e.g., wireless network 100).

As shown by reference number 1105, the decoding device may transmit, and the encoding device may receive, configuration information. In some aspects, the encoding device may receive configuration information from another device (e.g., from a base station, a UE, and/or the like), a communication standard, and/or the like. In some aspects, the encoding device may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the encoding device) for selection by the encoding device, explicit configuration information for the encoding device to use to configure the encoding device, and/or the like.

In some aspects, the configuration information may indicate that the encoding device is to transmit reports that indicate updates for one or more weights of a neural network configured for encoding CSF messages. In some aspects, the configuration information may indicate that the encoding device is to generate the reports to indicate updates for fewer than all weights of the neural network (e.g., based at least in part on configuration information, dynamic signaling, and/or the like).

In some aspects, the configuration information may indicate that the encoding device is to train the neural network to operate based at least in part on federated learning with additional devices. The configuration information may indicate that the encoding device is to transmit, to the multiple devices (e.g., a decoding device, a UE, and/or the like), a report that indicates updates for one or more weights of the neural network.

In some aspects, the configuration information may indicate that the encoding device is to report updates for the one or more weights with a configured periodicity. In some aspects, the configuration information may indicate that the encoding device is to report a first subset of updates for the one or more weights with a first configured periodicity and to report a second subset of the updates associated with a second layer of the neural network with a second periodicity. In some aspects, the configuration information may indicate that the encoding device is to report updates for the one or more weights based at least in part on a Doppler metric (e.g., a velocity, or a change in velocity, of the encoding device) of the encoding device.

As shown by reference number 1110, the encoding device may configure the encoding device for communicating with the decoding device. In some aspects, the encoding device may configure the encoding device based at least in part on the configuration information. In some aspects, the encoding device may be configured to perform one or more operations described herein.

As shown by reference number 1115, the encoding device may transmit an indication that one or more weights have been updated. In some aspects, the encoding device may inform the decoding device that weights in layers of the neural network have changed. The indication may identify the weights and/or layers (e.g., using a layer identification). In some aspects, the encoding device may transmit the indication via uplink control information (e.g., mapped to PUCCH, PUSCH, and/or the like), one or more MAC CEs, and/or the like.

As shown by reference number 1120, the encoding device may transmit an indication of a capability to use a neural network to determine differential updates. For example, the encoding device may indicate that the encoding device supports neural network based differential weight delta computation. In some aspects, the encoding device may indicate the capability in uplink control information, one or more MAC CEs, and/or the like.

As shown by reference number 1125, the encoding device may receive a request to report updates for one or more weights of a neural network configured for encoding CSF messages. In some aspects, the encoding device may receive the request via aperiodic signaling, semi-persistent signaling, downlink control information, one or more MAC CEs, and/or the like.

In some aspects, the request includes an indication of one or more layers of the neural network for which the first device is to report the updates. In some aspects, the request includes an indication of a subset of weights within the one or more layers of the neural network for which the first device is to report the updates.

As shown by reference number 1130, the encoding device may receive an indication to use a neural network to determine the differential updates. In some aspects, the indication to use the neural network to determine the differential updates may be included in the request to report updates for one or more weights of a neural network configured for encoding CSF messages. In some aspects, the indication may include an indication to report the updates as differential updates for the one or more weights, an indication of a differential time period to use for determining the differential updates for the one or more weights, and/or the like.

As shown by reference number 1135, the encoding device may transmit a report that indicates the updates for the one or more weights. In some aspects, the encoding device may transmit the report via one or more MAC CEs, a PUSCH, and/or the like. In some aspects, the encoding device may transmit the report to the multiple devices (e.g., a decoding device, a UE, and/or the like).

In some aspects, the encoding device may report updates for the one or more weights with a configured periodicity. In some aspects, the encoding device may report a first subset of updates for the one or more weights with a first configured periodicity and report a second subset of the updates associated with a second layer of the neural network with a second periodicity. In some aspects, the encoding device may report updates for the one or more weights based at least in part on a Doppler metric (e.g., a velocity, or a change in velocity, of the encoding device) of the encoding device.

As shown by reference number 1140, the encoding device may transmit an indication of a change in environment and/or a request to reset weights of the neural network. For example, the encoding device may transmit an indication of a change in environment at the first device, a request to reset all weights of the neural network, and/or the like. In some aspects, the encoding device may transmit the indication via one or more MAC CEs, uplink control information, and/or the like.

As shown by reference number 1145, the encoding device may receive an indication to reset weights of the neural network. In some aspects, the encoding device may receive the indication to reset all weights of the neural network based at least in part on a dynamic radio access network mode update. For example, the encoding device may change from an indoor environment to an outdoor environment, from a line-of-sight connection to a non-line-of-sight connection, and/or the like. In some aspects, the dynamic radio access network mode update may allow the encoding device to modify one or more transmission parameters (e.g., an MCS) that may allow the encoding device to modify a payload size of a CSF report. This may cause the encoding device to update the one or more weights.

Based at least in part on the decoding device requesting and receiving a report that indicates updates to weights of the neural network, the decoding device may decode CSF based at least in part on the updates to the weights. In this way, computing, communication, and/or network resources may be conserved that may otherwise have been used to detect and recover from errors that are based at least in part on the decoding device failing to decode the CSF.

Figure 12:
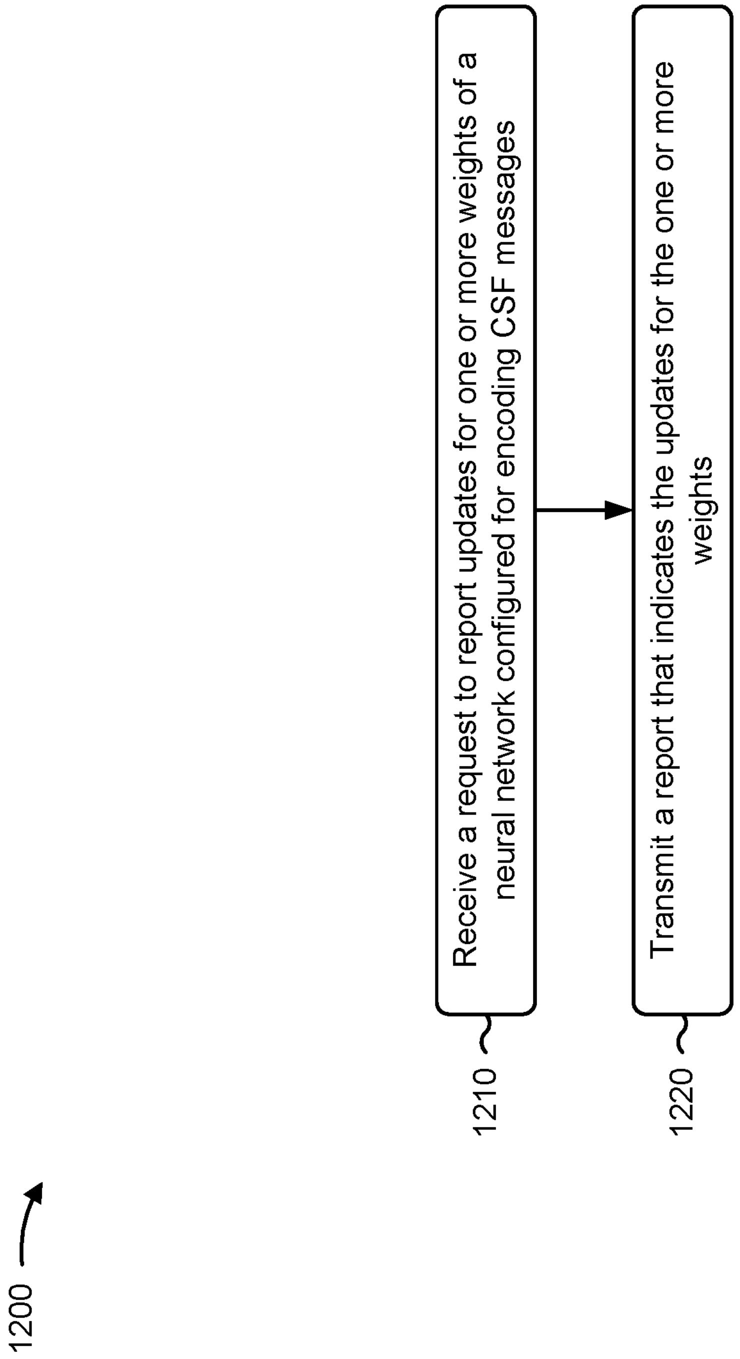
FIGS. 12 and 13 are diagrams illustrating example processes associated with reporting weight updates to a neural network for generating channel state information feedback, in accordance with the present disclosure.

FIG. 12 is a diagram illustrating an example process 1200 performed, for example, by a first device, in accordance with various aspects of the present disclosure. Example process 1200 is an example where the first device (e.g., an encoding device, UE 120, apparatus 1400 of FIG. 14, and/or the like) performs operations associated with reporting weight updates to a neural network for generating channel state information feedback.

As shown in FIG. 12, in some aspects, process 1200 may include receiving a request to report updates for one or more weights of a neural network configured for encoding CSF messages (block 1210). For example, the first device (e.g., using reception component 1402) may receive a request to report updates for one or more weights of a neural network configured for encoding CSF messages, as described above.

As further shown in FIG. 12, in some aspects, process 1200 may include transmitting a report that indicates the updates for the one or more weights (block 1220). For example, the first device (e.g., using transmission component 1404) may transmit a report that indicates the updates for the one or more weights, as described above.

Process 1200 may include additional aspects, such as any single aspect or any combination of aspects described below and/or in connection with one or more other processes described elsewhere herein.

In a first aspect, the request includes an indication of one or more layers of the neural network for which the first device is to report the updates.

In a second aspect, alone or in combination with the first aspect, the request includes an indication of a subset of weights, including the one or more weights, within the one or more layers of the neural network for which the first device is to report the updates.

In a third aspect, alone or in combination with one or more of the first and second aspects, receiving the request includes receiving the request via aperiodic signaling, receiving the request via semi-persistent signaling, receiving the request via downlink control information, receiving the request via one or more MAC CEs, or a combination thereof.

In a fourth aspect, alone or in combination with one or more of the first through third aspects, transmitting the report includes transmitting the report via one or more MAC CEs, or transmitting the report via a PUSCH.

In a fifth aspect, alone or in combination with one or more of the first through fourth aspects, process 1200 includes transmitting an indication that the one or more weights have been updated, wherein receiving the request is based at least in part on transmitting the indication.

In a sixth aspect, alone or in combination with one or more of the first through fifth aspects, transmitting the indication includes transmitting the indication via one or more of uplink control information, or one or more MAC CEs.

In a seventh aspect, alone or in combination with one or more of the first through sixth aspects, the neural network is based at least in part on federated learning.

In an eighth aspect, alone or in combination with one or more of the first through seventh aspects, transmitting the report includes transmitting the report to a second device, transmitting the report to a UE, or transmitting the report to the second device and the UE.

In a ninth aspect, alone or in combination with one or more of the first through eighth aspects, the request indicates to report the updates for the one or more weights with a configured periodicity.

In a tenth aspect, alone or in combination with one or more of the first through ninth aspects, the request indicates to report a first subset of the updates associated with a first layer of the neural network with a first periodicity, and the request indicates to report a second subset of the updates associated with a second layer of the neural network with a second periodicity.

In an eleventh aspect, alone or in combination with one or more of the first through tenth aspects, the request indicates to report the updates associated with one or more layers of the neural network based at least in part on a Doppler metric of the first device.

In a twelfth aspect, alone or in combination with one or more of the first through eleventh aspects, process 1200 includes receiving an indication to reset all weights of the neural network based at least in part on a dynamic radio access network mode update.

In a thirteenth aspect, alone or in combination with one or more of the first through twelfth aspects, process 1200 includes transmitting an indication of a change in environment at the first device, a request to reset all weights of the neural network, or the indication of the change in environment at the first device and the request to reset all weights of the neural network.

In a fourteenth aspect, alone or in combination with one or more of the first through thirteenth aspects, transmitting the indication includes transmitting the indication via one or more MAC CEs, or uplink control information.

In a fifteenth aspect, alone or in combination with one or more of the first through fourteenth aspects, the request includes one or more of an indication to report the updates as differential updates for the one or more weights, or an indication of a differential time period to use for determining the differential updates for the one or more weights.

In a sixteenth aspect, alone or in combination with one or more of the first through fifteenth aspects, process 1200 includes receiving an indication to use an additional neural network to determine the differential updates for the one or more weights.

In a seventeenth aspect, alone or in combination with one or more of the first through sixteenth aspects, process 1200 includes transmitting an indication of a capability of the first device to use the neural network to determine the differential updates for the one or more weights, wherein receiving the indication to use the additional neural network to determine the differential updates for the one or more weights is based at least in part on transmitting the indication of the capability of the first device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
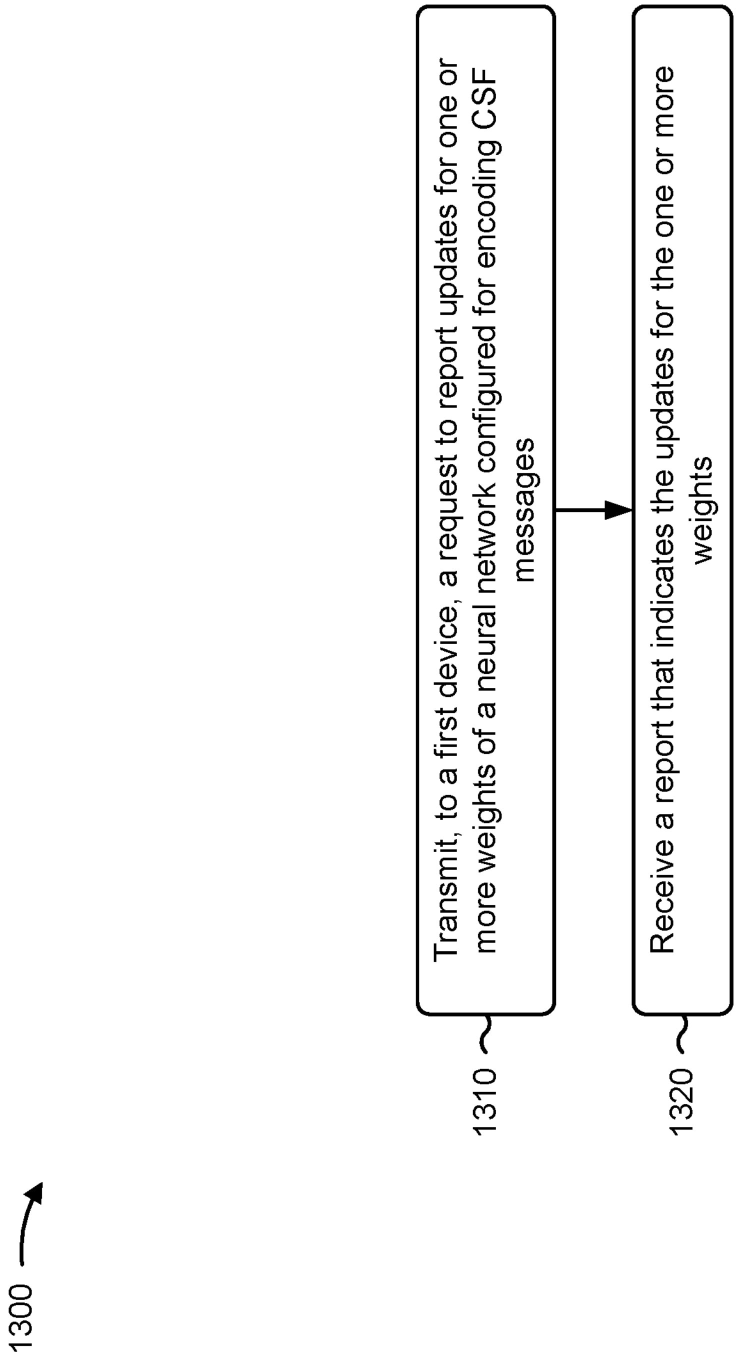

FIG. 13 is a diagram illustrating an example process 1300 performed, for example, by a second device, in accordance with various aspects of the present disclosure. Example process 1300 is an example where the second device (e.g., a decoding device, base station 110, apparatus 1500 of FIG. 15, and/or the like) performs operations associated with reporting weight updates to a neural network for generating channel state information feedback.

As shown in FIG. 13, in some aspects, process 1300 may include transmitting, to a first device, a request to report updates for one or more weights of a neural network configured for encoding CSF messages (block 1310). For example, the second device (e.g., using transmission component 1504) may transmit, to a first device, a request to report updates for one or more weights of a neural network configured for encoding CSF messages, as described above.

As further shown in FIG. 13, in some aspects, process 1300 may include receiving a report that indicates the updates for the one or more weights (block 1320). For example, the second device (e.g., using reception component 1502) may receive a report that indicates the updates for the one or more weights, as described above.

Process 1300 may include additional aspects, such as any single aspect or any combination of aspects described below and/or in connection with one or more other processes described elsewhere herein.

In a first aspect, the request includes an indication of one or more layers of the neural network for which the first device is to report the updates.

In a second aspect, alone or in combination with the first aspect, the request includes an indication of a subset of weights, including the one or more weights, within the one or more layers of the neural network for which the first device is to report the updates.

In a third aspect, alone or in combination with one or more of the first and second aspects, transmitting the request includes transmitting the request via aperiodic signaling, transmitting the request via semi-persistent signaling, transmitting the request via downlink control information, transmitting the request via one or more MAC CEs, or a combination thereof.

In a fourth aspect, alone or in combination with one or more of the first through third aspects, receiving the report includes receiving the report via one or more MAC CEs, or receiving the report via a PUSCH.

In a fifth aspect, alone or in combination with one or more of the first through fourth aspects, process 1300 includes receiving an indication that the one or more weights have been updated, wherein transmitting the request is based at least in part on receiving the indication.

In a sixth aspect, alone or in combination with one or more of the first through fifth aspects, receiving the indication includes receiving the indication via one or more of uplink control information, or one or more MAC CEs.

In a seventh aspect, alone or in combination with one or more of the first through sixth aspects, the neural network is based at least in part on federated learning.

In an eighth aspect, alone or in combination with one or more of the first through seventh aspects, the request indicates to report the updates for the one or more weights with a configured periodicity.

In a ninth aspect, alone or in combination with one or more of the first through eighth aspects, the request indicates to report a first subset of the updates associated with a first layer of the neural network with a first periodicity, and the request indicates to report a second subset of the updates associated with a second layer of the neural network with a second periodicity.

In a tenth aspect, alone or in combination with one or more of the first through ninth aspects, the request indicates to report the updates associated with one or more layers of the neural network based at least in part on a Doppler metric of the first device.

In an eleventh aspect, alone or in combination with one or more of the first through tenth aspects, process 1300 includes transmitting an indication to reset all weights of the neural network based at least in part on a dynamic radio access network mode update.

In a twelfth aspect, alone or in combination with one or more of the first through eleventh aspects, process 1300 includes receiving an indication of a change in environment at the first device, a request to reset all weights of the neural network, or the indication of the change in environment at the first device and the request to reset all weights of the neural network.

In a thirteenth aspect, alone or in combination with one or more of the first through twelfth aspects, receiving the indication includes receiving the indication via one or more MAC CEs, or uplink control information.

In a fourteenth aspect, alone or in combination with one or more of the first through thirteenth aspects, the request includes one or more of an indication to report the updates as differential updates for the one or more weights, or an indication of a differential time period to use for determining the differential updates for the one or more weights.

In a fifteenth aspect, alone or in combination with one or more of the first through fourteenth aspects, process 1300 includes transmitting an indication to use an additional neural network to determine the differential updates for the one or more weights.

In a sixteenth aspect, alone or in combination with one or more of the first through fifteenth aspects, process 1300 includes receiving an indication of a capability of the first device to use the neural network to determine the differential updates for the one or more weights, wherein transmitting the indication to use the additional neural network to determine the differential updates for the one or more weights is based at least in part on receiving the indication of the capability of the first device.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
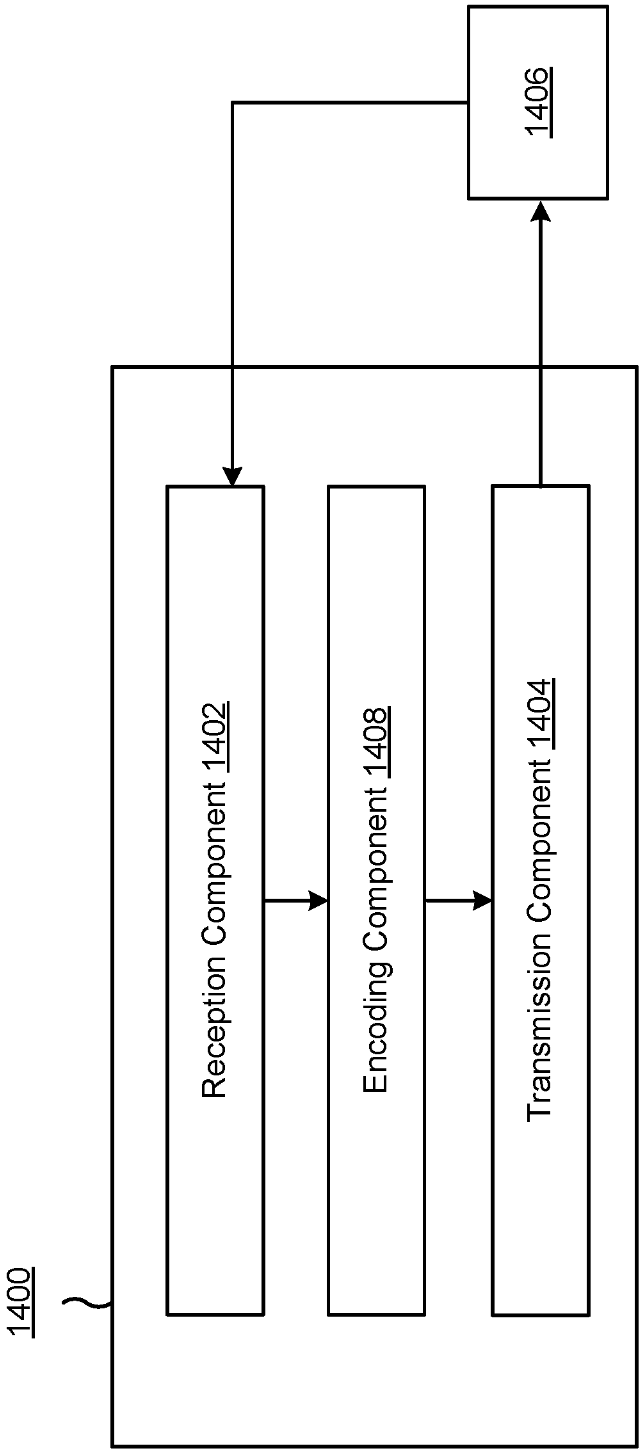
FIGS. 14 and 15 are examples of apparatuses for wireless communication in accordance with the present disclosure.

FIG. 14 is a block diagram of an example apparatus 1400 for wireless communication. The apparatus 1400 may be an encoding device, or an encoding device may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include an encoding component 1408.

In some aspects, the apparatus 1400 may be configured to perform one or more operations described herein in connection with FIGS. 3-8 and 11. Additionally or alternatively, the apparatus 1400 may be configured to perform one or more processes described herein, such as process 900 of FIG. 9, process 1200 of FIG. 12, or a combination thereof. In some aspects, the apparatus 1400 and/or one or more components shown in FIG. 14 may include one or more components of the encoding device described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the encoding device described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the encoding device described above in connection with FIG. 2. In some aspects, the transmission component 1404 may be collocated with the reception component 1402 in a transceiver.

The reception component 1402 may receive a request to report updates for one or more weights of a neural network configured for encoding CSF messages. The reception component 1402 may receive an indication to reset all weights of the neural network based at least in part on a dynamic radio access network mode update. The reception component 1402 may receive an indication to use an additional neural network to determine the differential updates for the one or more weights.

The transmission component 1404 may transmit a report that indicates the updates for the one or more weights. The transmission component 1404 may transmit an indication that the one or more weights have been updated. The transmission component 1404 may transmit an indication of a change in environment at the first device, a request to reset all weights of the neural network, or the indication of the change in environment at the first device and the request to reset all weights of the neural network. The transmission component 1404 may transmit an indication of a capability of the first device to use the neural network to determine the differential updates for the one or more weights.

The encoding component 1408 may perform differential encoding of weights used to generate a CSF message. In some aspects, the encoding component 1408 may include a controller/processor, a memory, or a combination thereof, of the encoding device described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
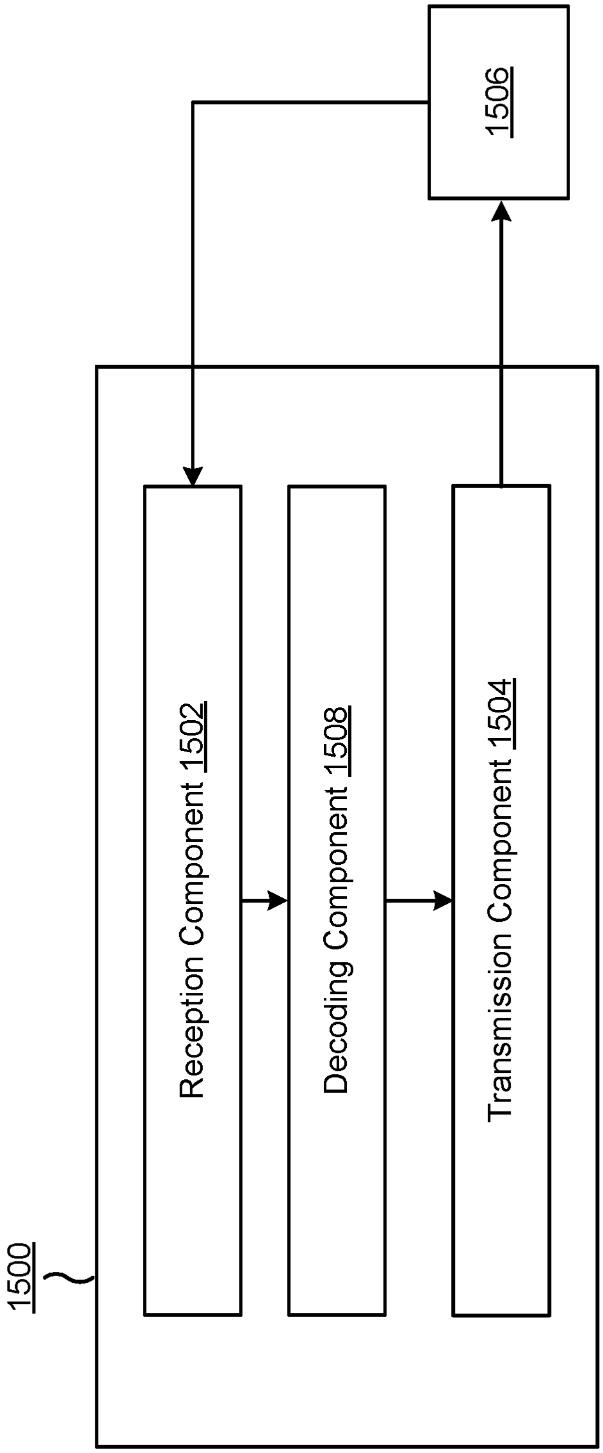

FIG. 15 is a block diagram of an example apparatus 1500 for wireless communication. The apparatus 1500 may be a decoding device, or a decoding device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a decoding component 1508.

In some aspects, the apparatus 1500 may be configured to perform one or more operations described herein in connection with FIGS. 3-8 and 11. Additionally or alternatively, the apparatus 1500 may be configured to perform one or more processes described herein, such as process 1000 of FIG. 10, process 1300 of FIG. 13, or a combination thereof. In some aspects, the apparatus 1500 and/or one or more components shown in FIG. 15 may include one or more components of the decoding device described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the decoding device described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the decoding device described above in connection with FIG. 2. In some aspects, the transmission component 1504 may be collocated with the reception component 1502 in a transceiver.

The transmission component 1504 may transmit, to a first device, a request to report updates for one or more weights of a neural network configured for encoding CSF messages. The transmission component 1504 may transmit an indication to reset all weights of the neural network based at least in part on a dynamic radio access network mode update. The transmission component 1504 may transmit an indication to use an additional neural network to determine the differential updates for the one or more weights The reception component 1502 may receive a report that indicates the updates for the one or more weights. The reception component 1502 may receive an indication that the one or more weights have been updated. The reception component 1502 may receive an indication of a change in environment at the first device, a request to reset all weights of the neural network, or the indication of the change in environment at the first device and the request to reset all weights of the neural network. The reception component 1502 may receive an indication of a capability of the first device to use the neural network to determine the differential updates for the one or more weights The decoding component 1508 may decode the multi-part neural network based CSF. In some aspects, the decoding component 1508 may include a controller/processor, a memory, or a combination thereof, of the encoding device described above in connection with FIG. 2.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
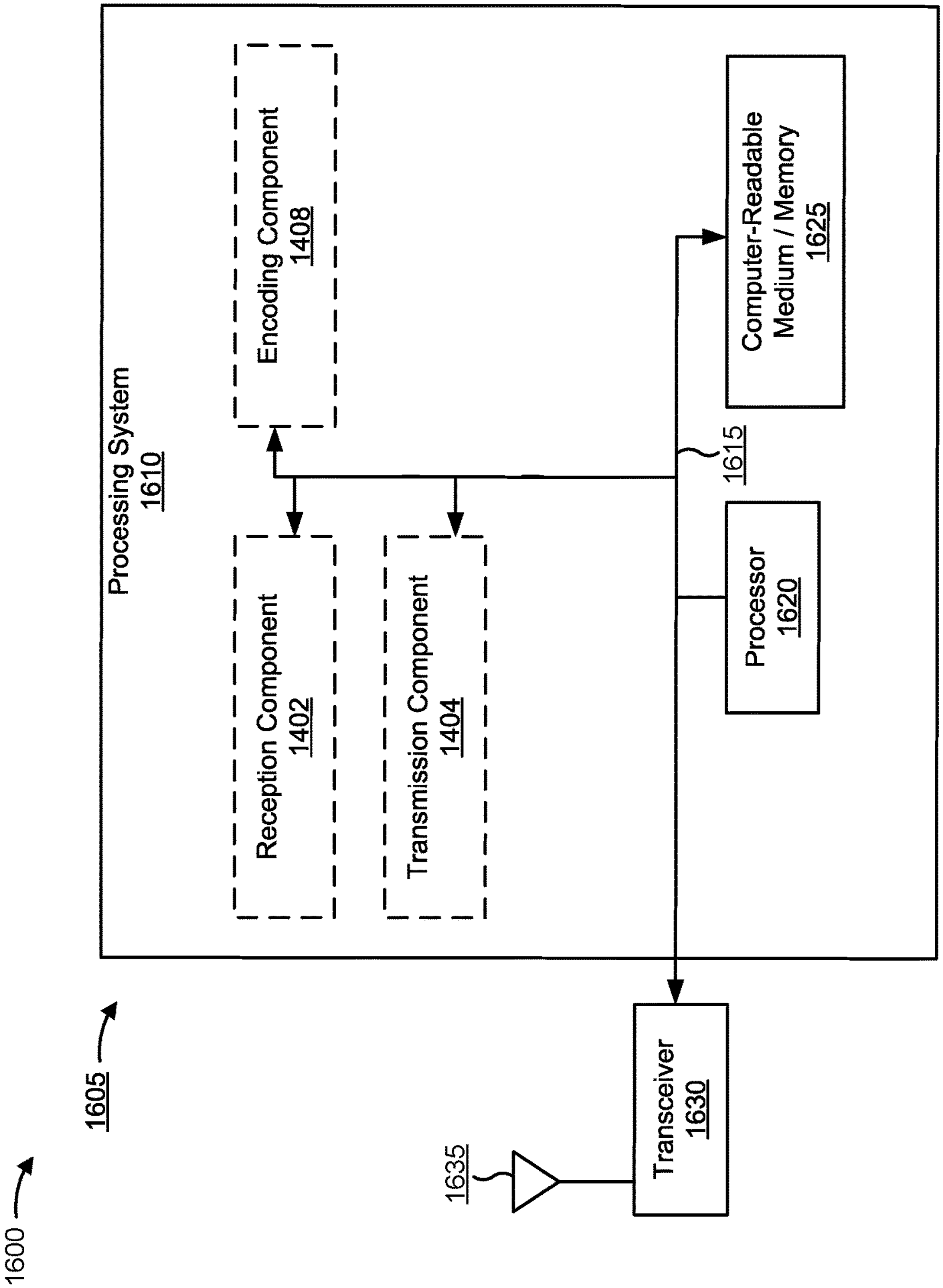
FIGS. 16 and 17 are diagrams illustrating examples of a hardware implementation for an apparatus employing a processing system.

FIG. 16 is a diagram illustrating an example 1600 of a hardware implementation for an apparatus 1605 employing a processing system 1610. The apparatus 1605 may be an encoding device.

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the illustrated components, and the computer-readable medium/memory 1625. The bus 1615 may also link various other circuits, such as timing sources, peripherals, voltage regulators, power management circuits, and/or the like.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1402. In addition, the transceiver 1630 receives information from the processing system 1610, specifically the transmission component 1404, and generates a signal to be applied to the one or more antennas 1635 based at least in part on the received information.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the illustrated components. The components may be software modules running in the processor 1620, resident/stored in the computer readable medium/memory 1625, one or more hardware modules coupled to the processor 1620, or some combination thereof.

In some aspects, the processing system 1610 may be a component of the UE 120 and may include the memory 282 and/or at least one of the TX MIMO processor 266, the RX processor 258, and/or the controller/processor 280. In some aspects, the apparatus 1605 for wireless communication includes means for receiving a request to report updates for one or more weights of a neural network configured for encoding CSF messages; and means for transmitting a report that indicates the updates for the one or more weights. The aforementioned means may be one or more of the aforementioned components of the apparatus 1400 and/or the processing system 1610 of the apparatus 1605 configured to perform the functions recited by the aforementioned means. As described elsewhere herein, the processing system 1610 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 16 is provided as an example. Other examples may differ from what is described in connection with FIG. 16.

Figure 17:
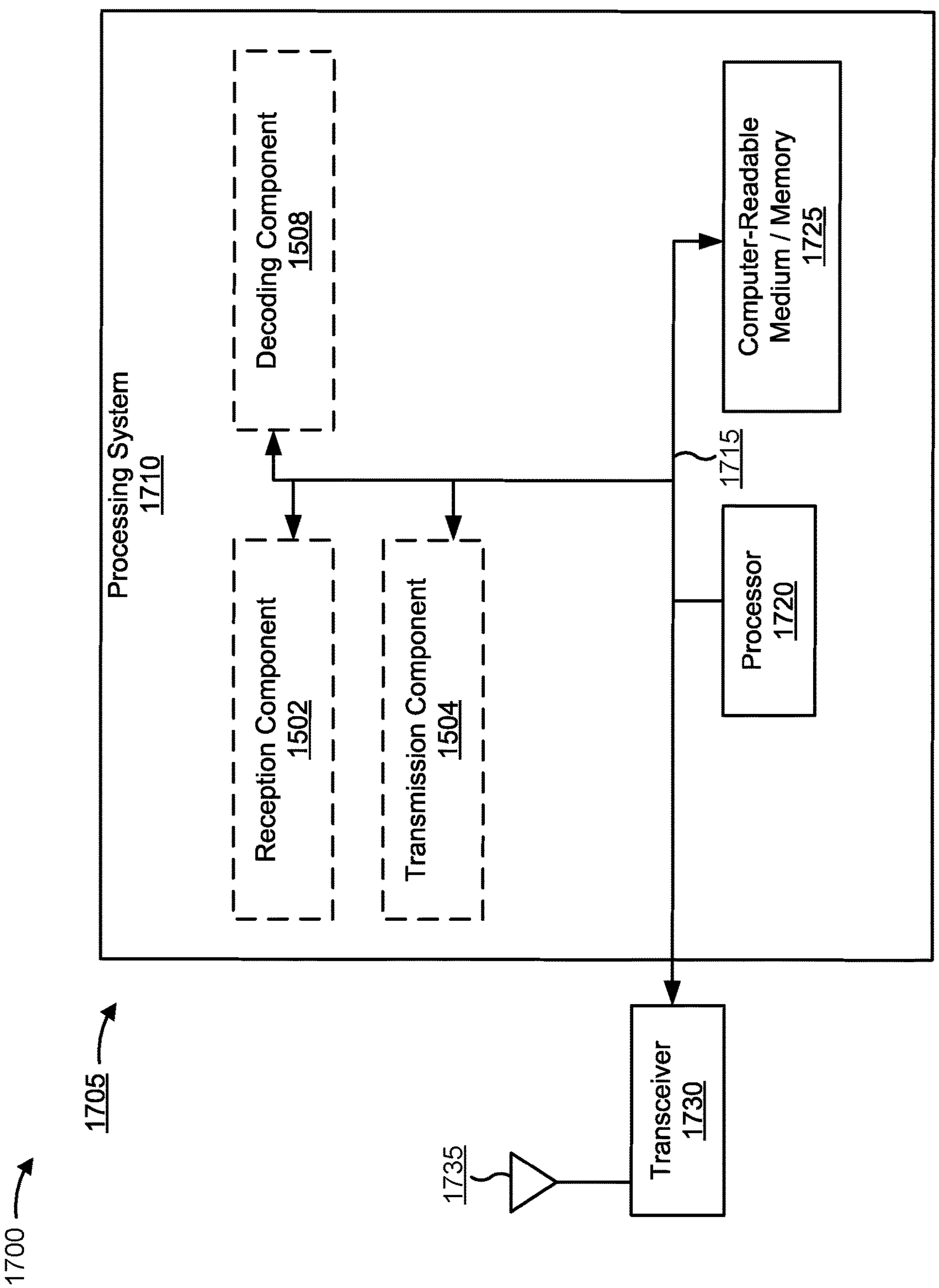

FIG. 17 is a diagram illustrating an example 1700 of a hardware implementation for an apparatus 1705 employing a processing system 1710. The apparatus 1705 may be a decoding device.

The processing system 1710 may be implemented with a bus architecture, represented generally by the bus 1715. The bus 1715 may include any number of interconnecting buses and bridges depending on the specific application of the processing system 1710 and the overall design constraints. The bus 1715 links together various circuits including one or more processors and/or hardware components, represented by the processor 1720, the illustrated components, and the computer-readable medium/memory 1725. The bus 1715 may also link various other circuits, such as timing sources, peripherals, voltage regulators, power management circuits, and/or the like.

The processing system 1710 may be coupled to a transceiver 1730. The transceiver 1730 is coupled to one or more antennas 1735. The transceiver 1730 provides a means for communicating with various other apparatuses over a transmission medium. The transceiver 1730 receives a signal from the one or more antennas 1735, extracts information from the received signal, and provides the extracted information to the processing system 1710, specifically the reception component 1502. In addition, the transceiver 1730 receives information from the processing system 1710, specifically the transmission component 1504, and generates a signal to be applied to the one or more antennas 1735 based at least in part on the received information.

The processing system 1710 includes a processor 1720 coupled to a computer-readable medium/memory 1725. The processor 1720 is responsible for general processing, including the execution of software stored on the computer-readable medium/memory 1725. The software, when executed by the processor 1720, causes the processing system 1710 to perform the various functions described herein for any particular apparatus. The computer-readable medium/memory 1725 may also be used for storing data that is manipulated by the processor 1720 when executing software. The processing system further includes at least one of the illustrated components. The components may be software modules running in the processor 1720, resident/stored in the computer readable medium/memory 1725, one or more hardware modules coupled to the processor 1720, or some combination thereof.

In some aspects, the processing system 1710 may be a component of the base station 110 and may include the memory 242 and/or at least one of the TX MIMO processor 230, the RX processor 238, and/or the controller/processor 240. In some aspects, the apparatus 1705 for wireless communication includes means for transmitting, to a first device, a request to report updates for one or more weights of a neural network configured for encoding CSF messages; and means for receiving a report that indicates the updates for the one or more weights. The aforementioned means may be one or more of the aforementioned components of the apparatus 1500 and/or the processing system 1710 of the apparatus 1705 configured to perform the functions recited by the aforementioned means. As described elsewhere herein, the processing system 1710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 17 is provided as an example. Other examples may differ from what is described in connection with FIG. 17.

Figure 18:
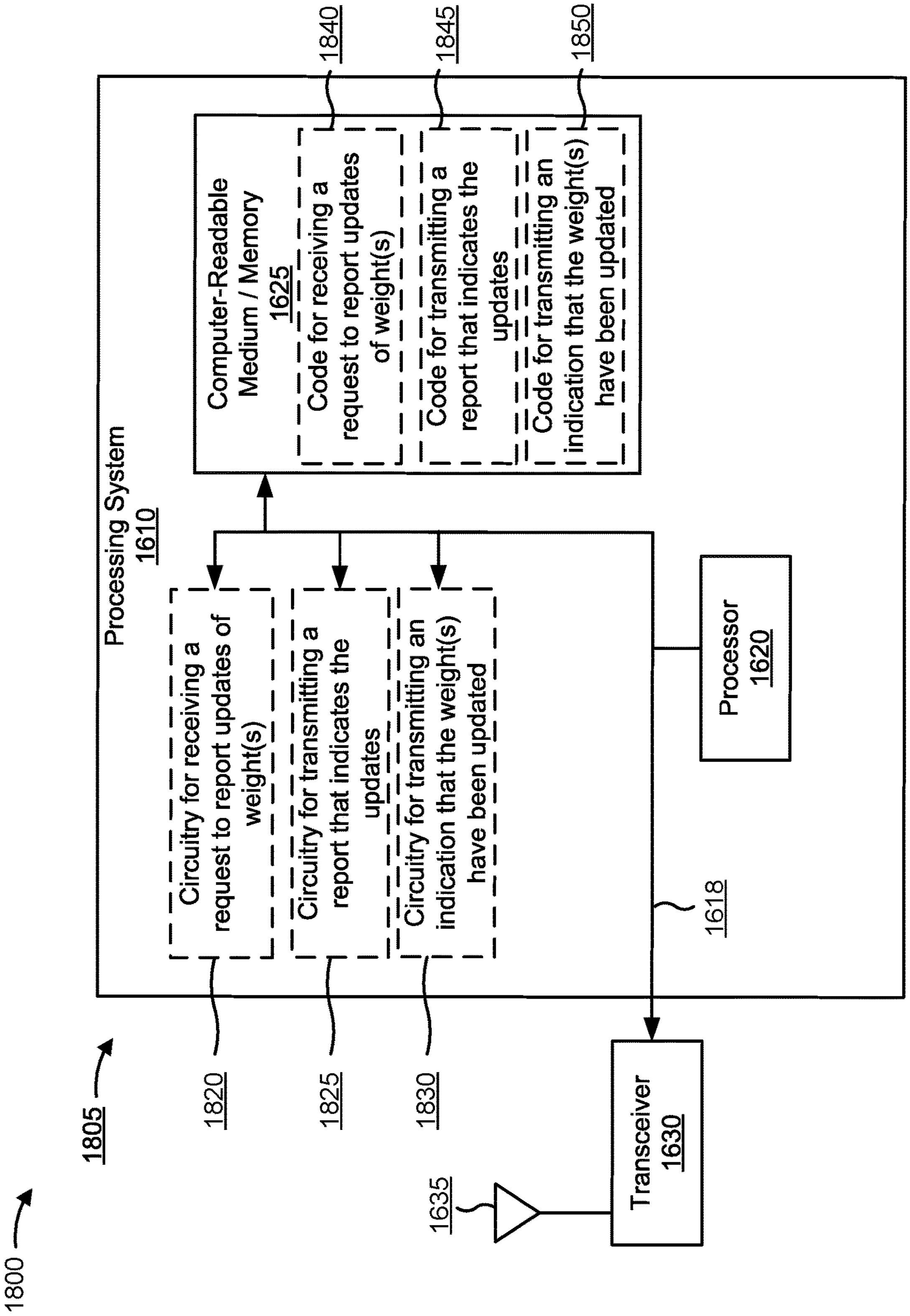
FIGS. 18 and 19 are diagrams illustrating examples of implementations of code and circuitry for an apparatus.

FIG. 18 is a diagram illustrating an example 1800 of an implementation of code and circuitry for an apparatus 1805. The apparatus 1805 may be an encoding device (e.g., a UE).

As shown in FIG. 18, the apparatus 1805 may include circuitry for receiving a request to report updates for one or more weights (circuitry 1820). For example, the circuitry 1820 may provide means for receiving a request to report updates for one or more weights of a neural network configured for encoding CSF messages.

As shown in FIG. 18, the apparatus 1805 may include circuitry for transmitting a report that indicates the updates (circuitry 1825). For example, the circuitry 1825 may provide means for transmitting a report that indicates the updates for the one or more weights.

As shown in FIG. 18, the apparatus 1805 may include circuitry for transmitting an indication that the one or more weights have been updated (circuitry 1830). For example, the circuitry 1830 may provide means for transmitting an indication that the one or more weights have been updated, wherein receiving the request is based at least in part on transmitting the indication.

The circuitry 1820, 1825, and/or 1830 may include one or more components of the UE described above in connection with FIG. 2, such as transmit processor 264, TX MIMO processor 266, MOD 254, DEMOD 254, MIMO detector 256, receive processor 258, antenna 252, controller/processor 280, and/or memory 282.

As shown in FIG. 18, the apparatus 1805 may include, stored in computer-readable medium 1625, code for receiving a request to report updates for one or more weights (code 1840). For example, the code 1840, when executed by the processor 1620, may cause the apparatus 1805 to receive a request to report updates for one or more weights of a neural network configured for encoding CSF messages.

As shown in FIG. 18, the apparatus 1805 may include, stored in computer-readable medium 1625, code for transmitting a report that indicates the updates (code 1845). For example, the code 1845, when executed by the processor 1620, may cause the apparatus 1805 to transmit a report that indicates the updates for the one or more weights.

As shown in FIG. 18, the apparatus 1805 may include, stored in computer-readable medium 1625, code for transmitting an indication that the one or more weights have been updated (code 1850). For example, the code 1850, when executed by the processor 1620, may cause the apparatus 1805 to transmit, to the second device, an indication of one or more weights used to transmit an indication that the one or more weights have been updated, wherein receiving the request is based at least in part on transmitting the indication.

FIG. 18 is provided as an example. Other examples may differ from what is described in connection with FIG. 18.

Figure 19:
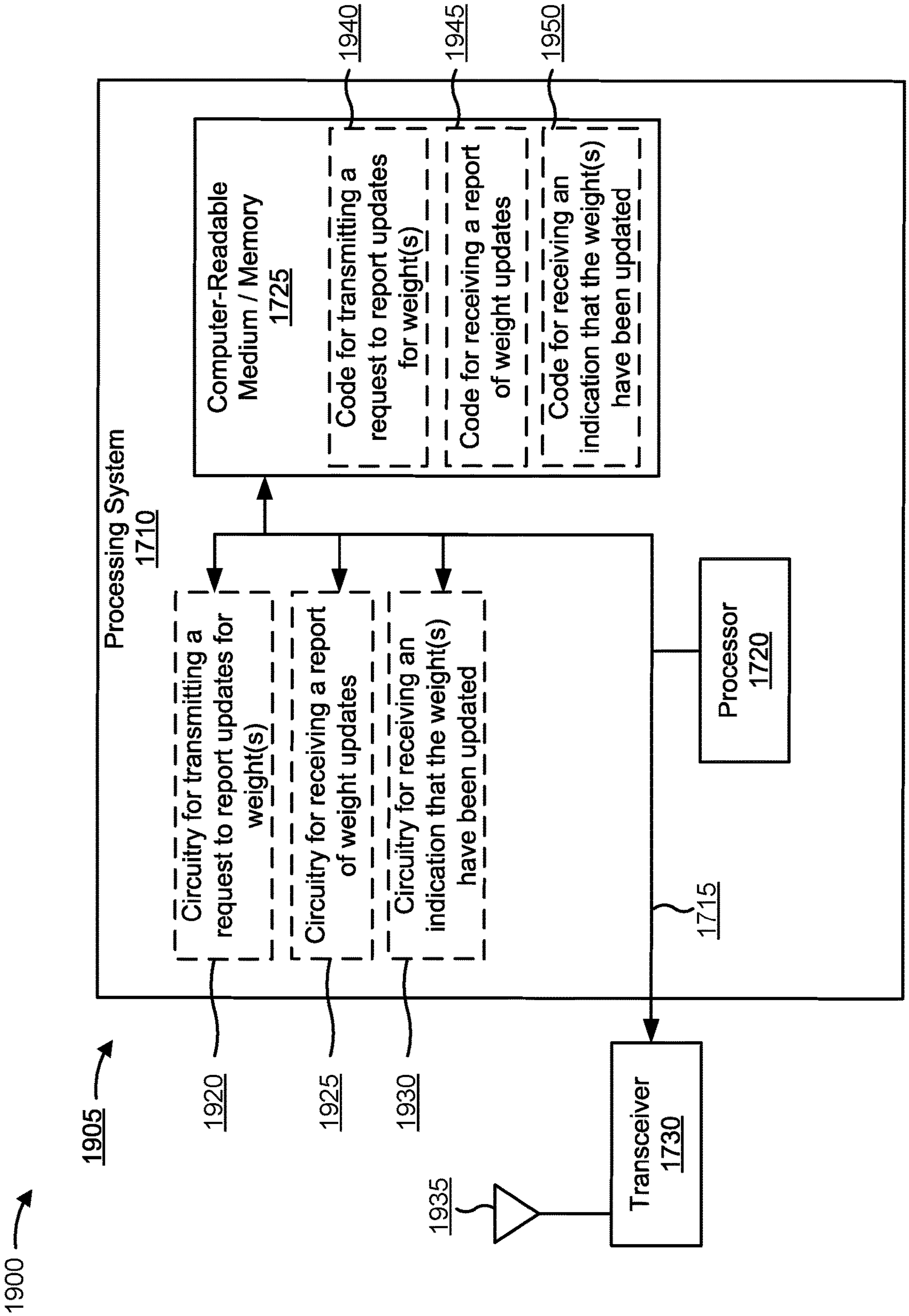

FIG. 19 is a diagram illustrating an example 1900 of an implementation of code and circuitry for an apparatus 1905. The apparatus 1905 may be an encoding device (e.g., a network device, a base station, another UE, a TRP, and/or the like).

As shown in FIG. 19, the apparatus 1905 may include circuitry for transmitting a request to report updates for one or more weights (circuitry 1920). For example, the circuitry 1920 may provide means for transmitting, to a first device, a request to report updates for one or more weights of a neural network configured for encoding CSF messages.

As shown in FIG. 19, the apparatus 1905 may include circuitry for receiving a report of weight updates (circuitry 1925). For example, the circuitry 1925 may provide means for receiving a report that indicates the updates for the one or more weights.

As shown in FIG. 19, the apparatus 1905 may include circuitry for receiving an indication that the one or more weights have been updated (circuitry 1930). For example, the circuitry 1930 may provide means for receiving an indication that the one or more weights have been updated, wherein receiving the request is based at least in part on transmitting the indication.

The circuitry 1920, 1925, and/or 1930 may include one or more components of the base station described above in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As shown in FIG. 19, the apparatus 1905 may include, stored in computer-readable medium 1725, code for transmitting a request to report updates for one or more weights (code 1940). For example, the code 1940, when executed by the processor 1720, may cause the apparatus 1905 to transmit, to a first device, a request to report updates for one or more weights of a neural network configured for encoding CSF messages.

As shown in FIG. 19, the apparatus 1905 may include, stored in computer-readable medium 1725, code for receiving a report of weight updates (code 1945). For example, the code 1945, when executed by the processor 1720, may cause the apparatus 1905 to receive a report that indicates the updates for the one or more weights.

As shown in FIG. 19, the apparatus 1905 may include, stored in computer-readable medium 1725, code for receiving an indication that the one or more weights have been updated (code 1950). For example, the code 1950, when executed by the processor 1720, may cause the apparatus 1905 to receive an indication that the one or more weights have been updated, wherein receiving the request is based at least in part on transmitting the indication.

FIG. 19 is provided as an example. Other examples may differ from what is described in connection with FIG. 19.

The following provides an overview of some Aspects of the present disclosure:

Aspect 1: A method of wireless communication performed by a first device, comprising: receiving a request to report updates for one or more weights of a neural network configured for encoding channel state information feedback (CSF) messages; and transmitting a report that indicates the updates for the one or more weights.

Aspect 2: The method of Aspect 1, wherein the request comprises: an indication of one or more layers of the neural network for which the first device is to report the updates.

Aspect 3: The method of Aspect 2, wherein the request comprises: an indication of a subset of weights, comprising the one or more weights, within the one or more layers of the neural network for which the first device is to report the updates.

Aspect 4: The method of any of Aspects 1-3, wherein receiving the request comprises: receiving the request via aperiodic signaling, receiving the request via semi-persistent signaling, receiving the request via downlink control information, receiving the request via one or more medium access control control elements (MAC CEs), or a combination thereof.

Aspect 5: The method of any of Aspects 1-4, wherein transmitting the report comprises: transmitting the report via one or more medium access control control elements (MAC CEs), or transmitting the report via a physical uplink shared channel.

Aspect 6: The method of any of Aspects 1-5, further comprising: transmitting an indication that the one or more weights have been updated, wherein receiving the request is based at least in part on transmitting the indication.

Aspect 7: The method of Aspect 6, wherein transmitting the indication comprises: transmitting the indication via one or more of: uplink control information, or one or more medium access control control elements (MAC CEs).

Aspect 8: The method of any of Aspects 1-7, wherein the neural network is based at least in part on federated learning.

Aspect 9: The method of Aspect 8, wherein transmitting the report comprises: transmitting the report to a second device, transmitting the report to a user equipment (UE), or transmitting the report to the second device and the UE.

Aspect 10: The method of any of Aspects 8-9, wherein the request indicates to report the updates for the one or more weights with a configured periodicity.

Aspect 11: The method of any of Aspects 8-10, wherein the request indicates to report a first subset of the updates associated with a first layer of the neural network with a first periodicity, and wherein the request indicates to report a second subset of the updates associated with a second layer of the neural network with a second periodicity.

Aspect 12: The method of any of Aspects 8-11, wherein the request indicates to report the updates associated with one or more layers of the neural network based at least in part on a Doppler metric of the first device.

Aspect 13: The method of any of Aspects 1-12, further comprising: receiving an indication to reset all weights of the neural network based at least in part on a dynamic radio access network mode update.

Aspect 14: The method of Aspect 13, further comprising: transmitting an indication of: a change in environment at the first device, a request to reset all weights of the neural network, or the change in environment at the first device and the request to reset all weights of the neural network.

Aspect 15: The method of Aspect 14, wherein transmitting the indication comprises: transmitting the indication via one or more medium access control control elements (MAC CEs), or uplink control information.

Aspect 16: The method of any of Aspects 1-15, wherein the request comprises one or more of: an indication to report the updates as differential updates for the one or more weights, or an indication of a differential time period to use for determining the differential updates for the one or more weights.

Aspect 17: The method of Aspect 16, further comprising: receiving an indication to use an additional neural network to determine the differential updates for the one or more weights.

Aspect 18: The method of Aspect 17, further comprising: transmitting an indication of a capability of the first device to use the neural network to determine the differential updates for the one or more weights, wherein receiving the indication to use the additional neural network to determine the differential updates for the one or more weights is based at least in part on transmitting the indication of the capability of the first device.

Aspect 19: A method of wireless communication performed by a second device, comprising: transmitting, to a first device, a request to report updates for one or more weights of a neural network configured for encoding channel state information feedback (CSF) messages; and receiving a report that indicates the updates for the one or more weights.

Aspect 20: The method of Aspect 19, wherein the request comprises: an indication of one or more layers of the neural network for which the first device is to report the updates.

Aspect 21: The method of Aspect 20, wherein the request comprises: an indication of a subset of weights, comprising the one or more weights, within the one or more layers of the neural network for which the first device is to report the updates.

Aspect 22: The method of any of Aspects 19-21, wherein transmitting the request comprises: transmitting the request via aperiodic signaling, transmitting the request via semi-persistent signaling, transmitting the request via downlink control information, transmitting the request via one or more medium access control control elements (MAC CEs), or a combination thereof.

Aspect 23: The method of any of Aspects 19-22, wherein receiving the report comprises: receiving the report via one or more medium access control control elements (MAC CEs), or receiving the report via a physical uplink shared channel.

Aspect 24: The method of any of Aspects 19-23, further comprising: receiving an indication that the one or more weights have been updated, wherein transmitting the request is based at least in part on receiving the indication.

Aspect 25: The method of Aspect 24, wherein receiving the indication comprises: receiving the indication via one or more of: uplink control information, or one or more medium access control control elements (MAC CEs).

Aspect 26: The method of any of Aspects 19-25, wherein the neural network is based at least in part on federated learning.

Aspect 27: The method of Aspect 26, wherein the request indicates to report the updates for the one or more weights with a configured periodicity.

Aspect 28: The method of any of Aspects 26-27, wherein the request indicates to report a first subset of the updates associated with a first layer of the neural network with a first periodicity, and wherein the request indicates to report a second subset of the updates associated with a second layer of the neural network with a second periodicity.

Aspect 29: The method of any of Aspects 26-28, wherein the request indicates to report the updates associated with one or more layers of the neural network based at least in part on a Doppler metric of the first device.

Aspect 30: The method of any of Aspects 19-29, further comprising: transmitting an indication to reset all weights of the neural network based at least in part on a dynamic radio access network mode update.

Aspect 31: The method of Aspect 30, further comprising: receiving an indication of: a change in environment at the first device, a request to reset all weights of the neural network, or the change in environment at the first device and the request to reset all weights of the neural network.

Aspect 32: The method of Aspect 31, wherein receiving the indication comprises: receiving the indication via one or more medium access control control elements (MAC CEs), or uplink control information.

Aspect 33: The method of any of Aspects 19-32, wherein the request comprises one or more of: an indication to report the updates as differential updates for the one or more weights, or an indication of a differential time period to use for determining the differential updates for the one or more weights.

Aspect 34: The method of Aspect 33, further comprising: transmitting an indication to use an additional neural network to determine the differential updates for the one or more weights.

Aspect 35: The method of Aspect 34, further comprising: receiving an indication of a capability of the first device to use the neural network to determine the differential updates for the one or more weights, wherein transmitting the indication to use the additional neural network to determine the differential updates for the one or more weights is based at least in part on receiving the indication of the capability of the first device.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the terms "first" device and "second" device may be used to distinguish one device from another device. The terms "first" and "second" may be intended to be broadly construed without indicating an order of the devices, relative locations of the devices, or an order of performance of operations in communications between the devices.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising one or more processors, coupled to one or more memories, wherein the one or more processors are configured to cause the first device to:
- receive configuration information indicating that the first device is to transmit reports that indicate updates for one or more weights of a neural network configured for encoding channel state information feedback (CSF) messages;
- transmit uplink control information that comprises an indication of the one or more weights of the neural network;
- transmit CSF based at least in part on encoding a data set using the neural network;
- receive a request to report updates for the one or more weights of the neural network configured for encoding the CSF messages; and
- transmit, responsive to the request, a report that indicates the differential updates for the one or more weights,
- wherein the request comprises an indication to report the updates as differential updates for the one or more weights, and
- wherein the one or more processors are further configured to:
  - transmit an indication of a capability of the first device to use the neural network to determine the differential updates for the one or more weights;
  - receive, after transmission of the capability, an indication to use an additional neural network to determine the differential updates for the one or more weights.

2. The first device of claim 1, wherein the request comprises one or more of:
- an indication of one or more layers of the neural network for which the first device is to report the update, or
- an indication of a subset of weights, comprising the one or more weights, within the one or more layers of the neural network for which the first device is to report the updates.

3. The first device of claim 1, wherein reception of the request is based at least in part on transmitting the indication.

4. The first device of claim 1, wherein the neural network is based at least in part on federated learning.

5. The first device of claim 4, wherein the one or more processors, to transmit the report, are configured to:
- transmit the report to a second device,
- transmit the report to a user equipment (UE), or
- transmit the report to the second device and the UE.

6. The first device of claim 4, wherein the request indicates to report the updates for the one or more weights with a configured periodicity.

7. The first device of claim 4, wherein the request indicates to report a first subset of the updates associated with a first layer of the neural network with a first periodicity, and
- wherein the request indicates to report a second subset of the updates associated with a second layer of the neural network with a second periodicity.

8. The first device of claim 4, wherein the request indicates to report the updates associated with one or more layers of the neural network based at least in part on a Doppler metric of the first device.

9. The first device of claim 1, wherein the one or more processors are further configured to:
- receive an indication to reset all weights of the neural network based at least in part on a dynamic radio access network mode update.

10. The first device of claim 9, wherein the one or more processors are further configured to:
- transmit an indication of:
  - a change in environment at the first device,
  - a request to reset all weights of the neural network, or
  - the change in environment at the first device and the request to reset all weights of the neural network.

11. The first device of claim 1, wherein the request comprises: an indication of a differential time period to use for determining the differential updates for the one or more weights.

12. A second device for wireless communication, comprising one or more processors, coupled to one or more memories, wherein the one or more processors are configured to cause the second device to:
- transmit, to a first device, configuration information indicating that the first device is to transmit reports that indicate updates for one or more weights of a neural network configured for encoding channel state information feedback (CSF) messages at the first device;
- receive, from the first device, uplink control information that comprises an indication of the one or more weights of the neural network;
- receive CSF based at least in part on encoding a data set using the neural network;
- transmit, to the first device, a request to report updates for the one or more weights of the neural network configured for encoding the CSF messages; and
- receive a report that indicates the differential updates for the one or more weights,
- wherein the request comprises an indication to report the updates as differential updates for the one or more weights, and
- wherein the one or more processors are further configured to:
  - receive an indication of a capability of the first device to use the neural network to determine the differential updates for the one or more weights, transmit an indication to use an additional neural network to determine the differential updates for the one or more weights wherein transmission of the indication to use the additional neural network to determine the differential updates for the one or more weights is based at least in part on receiving the indication of the capability of the first device.

13. The second device of claim 12, wherein the request comprises one or more of:

an indication of one or more layers of the neural network for which the first device is to report the updates, or an indication of a subset of weights, comprising the one or more weights, within the one or more layers of the neural network for which the first device is to report the updates.

14. The second device of claim 12, wherein the neural network is based at least in part on federated learning.

15. The second device of claim 14, wherein the request indicates one or more of:

to report the updates for the one or more weights with a configured periodicity, or to report a first subset of the updates associated with a first layer of the neural network with a first periodicity, wherein the request indicates to report a second subset of the updates associated with a second layer of the neural network with a second periodicity.

16. The second device of claim 14, wherein the request indicates to report the updates associated with one or more layers of the neural network based at least in part on a Doppler metric of the first device.

17. The second device of claim 12, wherein the one or more processors are further configured to:

transmit an indication to reset all weights of the neural network based at least in part on a dynamic radio access network mode update.

18. The second device of claim 17, wherein the one or more processors are further configured to:

receive an indication of:

a change in environment at the first device, a request to reset all weights of the neural network, or the change in environment at the first device and the request to reset all weights of the neural network.

19. The second device of claim 12, wherein the request comprises an indication of a differential time period to use for determining the differential updates for the one or more weights.

20. A method of wireless communication performed by a first device, comprising:

receiving configuration information indicating that the first device is to transmit reports that indicate updates for one or more weights of a neural network configured for encoding channel state information feedback (CSF) messages;

transmitting uplink control information that comprises an indication of the one or more weights of the neural network;

transmitting CSF based at least in part on encoding a data set using the neural network;

receiving a request to report updates for the one or more weights of the neural network configured for encoding the CSF; and transmitting, responsive to the request, a report that indicates the differential updates for the one or more weights, wherein the request comprises an indication to report the updates as differential updates for the one or more weights, and wherein the method further comprises:

transmitting an indication of a capability of the first device to use the neural network to determine the differential updates for the one or more weights;

receiving, after transmission of the capability, an indication to use an additional neural network to determine the differential updates for the one or more weights.

21. The method of claim 20, wherein the request comprises one or more of:

an indication of one or more layers of the neural network for which the first device is to report the update, or an indication of a subset of weights, comprising the one or more weights, within the one or more layers of the neural network for which the first device is to report the updates.

22. The method of claim 20, further comprising: transmitting an indication that the one or more weights have been updated, wherein receiving the request is based at least in part on transmitting the indication.

23. The method of claim 20, wherein the request comprises an indication of a differential time period to use for determining the differential updates for the one or more weights.

24. A method of wireless communication performed by a second device, comprising:

transmitting, to a first device, configuration information indicating that the first device is to transmit reports that indicate updates for one or more weights of a neural network configured for encoding channel state information feedback (CSF) messages at the first device;

receiving, from the first device, uplink control information that comprises an indication of the one or more weights of the neural network;

receiving CSF based at least in part on encoding a data set using the neural network;

transmitting, to the first device, a request to report updates for the one or more weights of the neural network configured for encoding the CSF messages; and receiving a report that indicates the updates for the one or more weights, wherein the request comprises an indication to report the updates as differential updates for the one or more weights, and wherein the one or more processors are further configured to:

receive an indication of a capability of the first device to use the neural network to determine the differential updates for the one or more weights, transmit an indication to use an additional neural network to determine the differential updates for the one or more weights wherein transmission of the indication to use the additional neural network to determine the differential updates for the one or more weights is based at least in part on receiving the indication of the capability of the first device.

25. The method of claim 24, wherein the request comprises one or more of:

an indication of one or more layers of the neural network for which the first device is to report the updates, or an indication of a subset of weights, comprising the one or more weights, within the one or more layers of the neural network for which the first device is to report the updates.

26. The method of claim 24, further comprising: receiving an indication that the one or more weights have been updated, wherein transmitting the request is based at least in part on receiving the indication.

27. The method of claim 24, wherein the request comprises an indication of a differential time period to use for determining the differential updates for the one or more weights.

* * * * *